(12) United States Patent
Kagan

(10) Patent No.: US 6,732,890 B2
(45) Date of Patent: May 11, 2004

(54) METHODS EMPLOYING PERMANENT MAGNETS HAVING REACH-OUT MAGNETIC FIELDS FOR ELECTROMAGNETICALLY PUMPING, BRAKING, AND METERING MOLTEN METALS FEEDING INTO METAL CASTING MACHINES

(75) Inventor: Valery G. Kagan, Colchester, VT (US)

(73) Assignee: Hazelett Strip-Casting Corporation, Colchester, VT (US)

( * ) Notice: Subject to any disclaimer, the term of this patent is extended or adjusted under 35 U.S.C. 154(b) by 0 days.

(21) Appl. No.: 10/084,556

(22) Filed: Feb. 26, 2002

(65) Prior Publication Data

US 2002/0190444 A1 Dec. 19, 2002

Related U.S. Application Data

(63) Continuation-in-part of application No. 09/483,813, filed on Jan. 15, 2000, now Pat. No. 6,378,743.

(51) Int. Cl.[7] .............................................. B22D 37/00
(52) U.S. Cl. ........................ 222/590; 222/594; 266/237
(58) Field of Search ................................ 266/236, 237; 222/590, 591, 594

(56) References Cited

U.S. PATENT DOCUMENTS

| 5,728,036 A | * | 3/1998 | Kagan et al. | ................ | 164/431 |
| 5,799,720 A | * | 9/1998 | Ross et al. | .................. | 222/591 |
| 5,967,223 A | * | 10/1999 | Kagan et al. | ................ | 164/481 |
| 6,378,743 B1 | * | 4/2002 | Kagan | ........................ | 222/590 |

* cited by examiner

Primary Examiner—Scott Kastler
(74) Attorney, Agent, or Firm—McCormick, Paulding & Huber LLP

(57) ABSTRACT

Method precisely, quickly controls flow of molten metal to metal-casting apparatus by pumping, braking or throttling. The Faraday-Ampére principle of current flow in a unidirectional magnetic field is employed. Permanent magnets comprising neodymium or similar high-energy, rare-earth materials provide "reach-out" magnetism. These neo-magnets, usually shown as cubes, are arranged in various powerful configurations driving intense unidirectional magnetic field B across a non-magnetic gap many times larger than economically feasible otherwise. This gap accommodates a conduit for pressurizing and moving a flow of molten metal. In making multiple identical castings, a controlled, intermittent, predetermined flow of molten metal is fed to a series of identical individual molds. The invention obviates needs for operating metallurgical valves or expensive tilting mechanisms for metallurgical furnaces. Existing furnaces too low to permit inflow by gravity may be rendered usable by embodiments of this invention.

23 Claims, 20 Drawing Sheets

METHODS EMPLOYING PERMANENT MAGNETS HAVING REACH-OUT MAGNETIC FIELDS FOR ELECTROMAGNETICALLY PUMPING, BRAKING, AND METERING MOLTEN METALS FEEDING INTO METAL CASTING MACHINES

CROSS REFERENCE TO RELATED APPLICATION

This application is a continuation-in-Part of U.S. patent application Ser. No. 09/483,813 filed Jan. 15, 2000, now U.S. Pat. No. 6,378,743, the contents of which are hereby incorporated by reference.

FIELD OF THE INVENTION

The invention is in the field of casting of metals, specifically, the electromagnetic transferring of molten metals in the manufacture of metallic articles by casting, for example, by continuous metal-casting machines. And, for example, by periodically transferring measured, metered, controlled and/or predetermined quantities of molten metal into casting apparatus involving a succession of identical molds for producing a sequence or series of substantially identical metal castings. Novel methods, system and apparatus embodying the invention employ permanent magnets having reach-out magnetic fields to electromagnetically transfer, brake, measure and control the flow of molten metal.

BACKGROUND OF THE INVENTION

The need for controlled flow of commercial quantities of molten metal is critical in the casting of metals in various kinds of casting apparatus in order to prevent either overflows or insufficiencies. For example, continuous controlled flow is advantageous for matching the flow rate of molten metal to the speed of a metal-casting device or machine into which the molten metal is being fed on a continuous basis. In the prior art, expensive tilting furnaces, launders, and servo controlled stopper rods are used. However, response to control signals in the prior art has been relatively sluggish, and maintenance may be costly. Moreover, each stopping of a continuous-casting operation may involve the dumping and remelting of much molten metal.

Smith et al. in U.S. Pat. No. 5,377,961 disclosed a device for ejecting small drops of solder onto a circuit board. Their device operated on a principle which goes back to Michael Faraday and André-Marie Ampére in the early nineteenth century. Faraday's three-dimensional three-finger rule of induced electromotive force is exemplified also in the windings of electrical-machine rotors. This principle also is known as the Ampére-Lorentz law.

L. R. Blake and D. A. Watt, in their separate articles referenced above, describe pumps of similar principle used for pumping molten sodium or potassium as coolant through cores of atomic reactors. In their pumps, the electromagnet was very large and expensive and used an enormous flow of electrical current. Around 100,000 amperes were required to pump 2,000 gallons a minute of such very light liquid metal (Watt, pp. 98, 95).

Bykhovsky et al. in U.S. Pat. No. 5,009,399 used the Faraday principle. Their pressurizing zone was a disc-shaped, axially thin, circular cylindrical cavity in which molten metal was induced to swirl. An electromagnetic "solenoid" without moving parts was the source of unidirectional magnetism through the thin dimension of the cylindrical cavity.

Electromagnets and ordinary permanent magnets are drastically diminished in their magnetic flux density by an obstacle of even a small non-magnetic gap placed in their magnetic circuit.

SUMMARY OF THE DISCLOSURE

My methods, system and apparatus embodying the present invention are applicable for electromagnetically impelling, transferring, braking, measuring and/or controlling the flow of substantial quantities of molten metal through a pressurizing conduit. Such flow of molten metal can be toward or into any suitable casting apparatus, for example, such as a continuous controlled flow into a continuous metal-casting machine as illustratively shown in FIGS. 1 and 1A. Also, such flow can be, for example, a periodic transfer of measured, metered, controlled and/or predetermined quantities of molten metal into suitable casting apparatus involving a succession of identical molds for producing a sequence or series of identical metal castings.

The Faraday-Ampére principle is employed, in the motor mode, by which electrical energy is converted into mechanical energy for usage most characteristically as a pump. The mode of operation is readily reversible for serving as a brake or throttle.

The prohibitive cost and huge bulk of an electromagnet for attaining the requisite magnetic excitation to bridge a large gap in the magnetic circuit is avoided by the use of permanent, high-energy "neo-magnets" consisting of magnetic material which comprises a rare-earth element, for example such as neodymium. I have calculated that the coils themselves, i.e. the magnet-wire windings, of the most efficient configuration of an electromagnet of equivalent capability to that of rare-earth-containing, high-energy, permanent neo-magnets would occupy about 130 times the volume that are occupied by the neo-magnets. Moreover, the neo-magnets do not generate waste heat, whereas an electromagnet would generate considerable heat, due to passage of large amperage through electrical resistance of its windings.

The "reach-out" capability of the neo-magnets positioned, oriented and arranged in specifically configured assemblies as shown and described enable, for the first time, an economically feasible, precise control of the flow of commercial quantities of molten metals. Such precise control makes possible the starting or stopping or adjusting of molten-metal flows almost instantaneously. There are no moving parts. The molten-metal flow area is enclosed, or is protected by an inert atmosphere and hence the flow avoids turbulent and corrosive contact with the atmosphere.

The method, system and apparatus optionally include an electromagnetic flowmeter. This flowmeter employs the Faraday principle in the generating mode, by which mechanical energy is converted into electrical energy. Thus, output of an electrical sensor indicates molten-metal speed and may be used to control pumping dynamics.

BRIEF DESCRIPTION OF THE DRAWINGS

In the drawings, open arrows labeled B represent an intense magnetic field having an axis of unidirectional magnetic flux. Open arrows labeled I represent the axis of direct current shown flowing from "+" to "−" in several Figures. Open arrows labeled M represent the direction of molten-metal flow in the pumping mode; and open arrows P represent travel of frozen product.

Corresponding reference numbers and letters indicate corresponding elements, members and/or components in various Figures.

FIG. 2A shows only the neo-magnet assemblies, with their pole pieces retained in the non-magnetic shells or jackets and the soft-ferromagnetic frame.

FIG. 7 is seen from the same viewpoint as in FIGS. 4 and 6. For clarity of illustration, inert filler blocks, which are shown in FIGS. 9 and 10, are omitted from FIGS. 7 and 8.

FIG. 19 shows a rectangular ferromagnetic frame associated with the two cubical assemblies of neo-magnets. This frame is omitted from FIG. 18 for clarity of illustration.

DETAILED DESCRIPTION OF THE PREFERRED EMBODIMENTS

The purpose of the described electromagnetic pumps 32, 32G (FIGS. 2, 4) is to impel or restrain the flow of molten metal toward, or into, a mold or a metal-casting machine.

Figure 1:
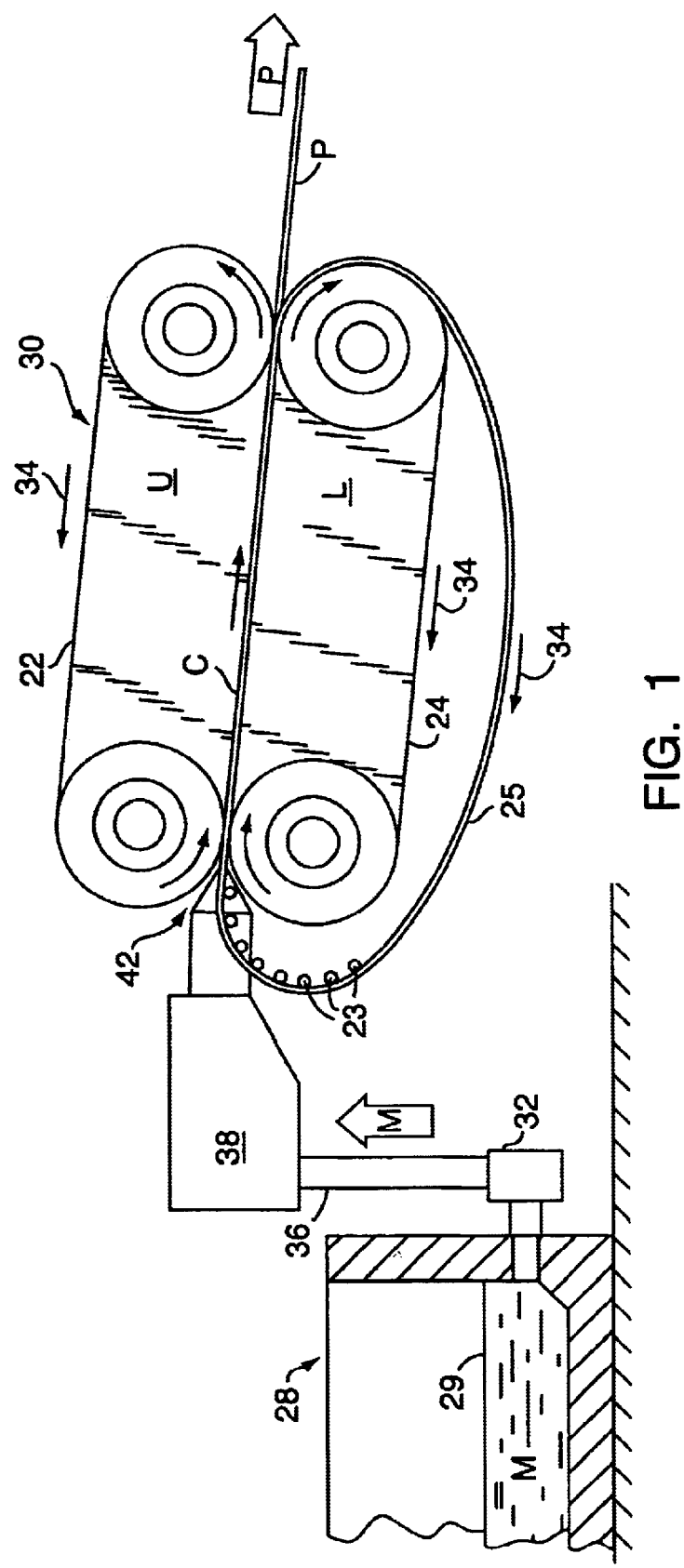
FIG. 1 is an elevation view showing an electromagnetic pump embodying the invention and arranged to pump molten metal upwardly from a furnace to a continuous belt metal-casting machine as one example of a casting device which may be used to advantage in cooperation with such an electromagnetic pump.
Figure 1A:
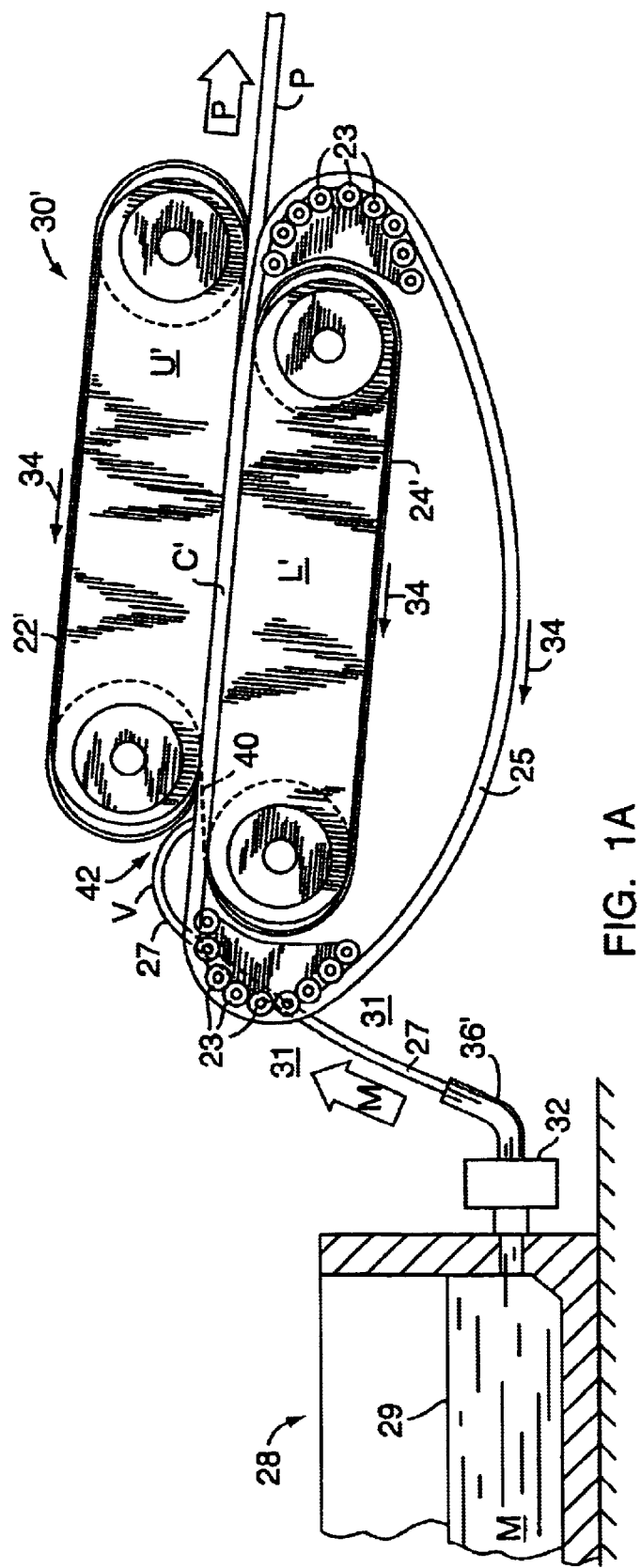
FIG. 1A is like FIG. 1 except that the conduit from the pump to the continuous casting machine is largely omitted. In this FIG. 1A, the molten metal is shown being propelled upwardly in the form of a free, unconfined, parabolic-arch jet-fountain-stream moving through a protective inert atmosphere.

Embodiments of the present invention may, for example, be used to advantage in connection with a belt-type continuous metal-casting machine 30 (FIG. 1) or 30' (FIG. 1A). Such machines are known in the art of continuous casting and utilize one or more endless flexible belts 22 or 22', 24 or 24' as a wall or walls of a moving mold cavity C. Such a casting belt is moving, endless, thin, flexible, heat-conductive, and liquid-cooled, normally by water. In a machine employing two belts, an upper casting belt 22 or 22' is revolved around an upper carriage U or U', and a lower casting belt 24 or 24' is revolved around a lower carriage L or L'. The two belts are revolved in unison around oval paths as indicated by arrows 34, while the molten metal freezes between them in moving mold cavity C formed between the two revolving casting belts to form an emerging cast product P.

As known in the continuous casting machine art, a pair of laterally spaced edge dams 25 (only one is seen in FIGS. 1 and 1A) also are revolved (arrow 34) and are suitably guided by free-turning rollers 23. These edge dams define laterally a pair of spaced sides of moving mold cavity C.

As an illustrative embodiment, a supply of molten metal M in a melting furnace or holding furnace 28 (FIGS. 1, 1A) flows into an electromagnetic pump 32 (FIGS. 1, 1A, 2, 3, 3A), optionally provided with self-heating means (not shown). The electromagnetic pump 32 is at a lower elevation relative to level 29 of molten metal for permitting furnace 28 to be drained down to a desired level without need for priming the pump. Internally insulated pipe 36 conveys the metal M upward toward the casting machine 30. In FIG. 1, the metal M is pumped upward into a tundish or distributor 38 for distributing the flowing metal into the upstream entrance end 42 of the continuous metal-casting machine 30.

Another illustrative embodiment of the invention for feeding molten metal M through an electromagnetic pump 32 into a casting machine 30' is shown in FIG. 1A, where the internally insulated pipe 36 of FIG. 1 is short and curved to form an elbow pipe 36'. Upwardly pumped molten metal M is propelled upward in one (or more) free, unconfined parabolic path(s) in the form of one or more unconstrained jet-fountain-streams 27 traveling through a suitably inert ambient atmosphere 31. The stream (or streams) 27 finally pour into an open pool 40 of molten metal at a position shortly beyond a vertex V of their parabolic path(s). In FIG. 1A the open pool 40 is provided by positioning the upper carriage U' somewhat downstream relative to lower carriage L'. This jet-fountain-stream method of upwardly pumping and pouring 27 (FIG. 1A) into an open pool has an advantage of avoiding contamination in the event that refractory lining of pipe 36 or 36' may become fragile and crumbly when metals of high melting temperature are poured. Hence, being eliminated is a possible source of contamination of the molten metal M in moving mold cavity C and in product P. Any crumbly particles or flakes of refractory material which might start to be propelled upwardly by the jet-fountain-stream 27 are free to drop out of, and separate from, the unconstrained stream(s) before the stream(s) reach the vertex V.

Figure 4:
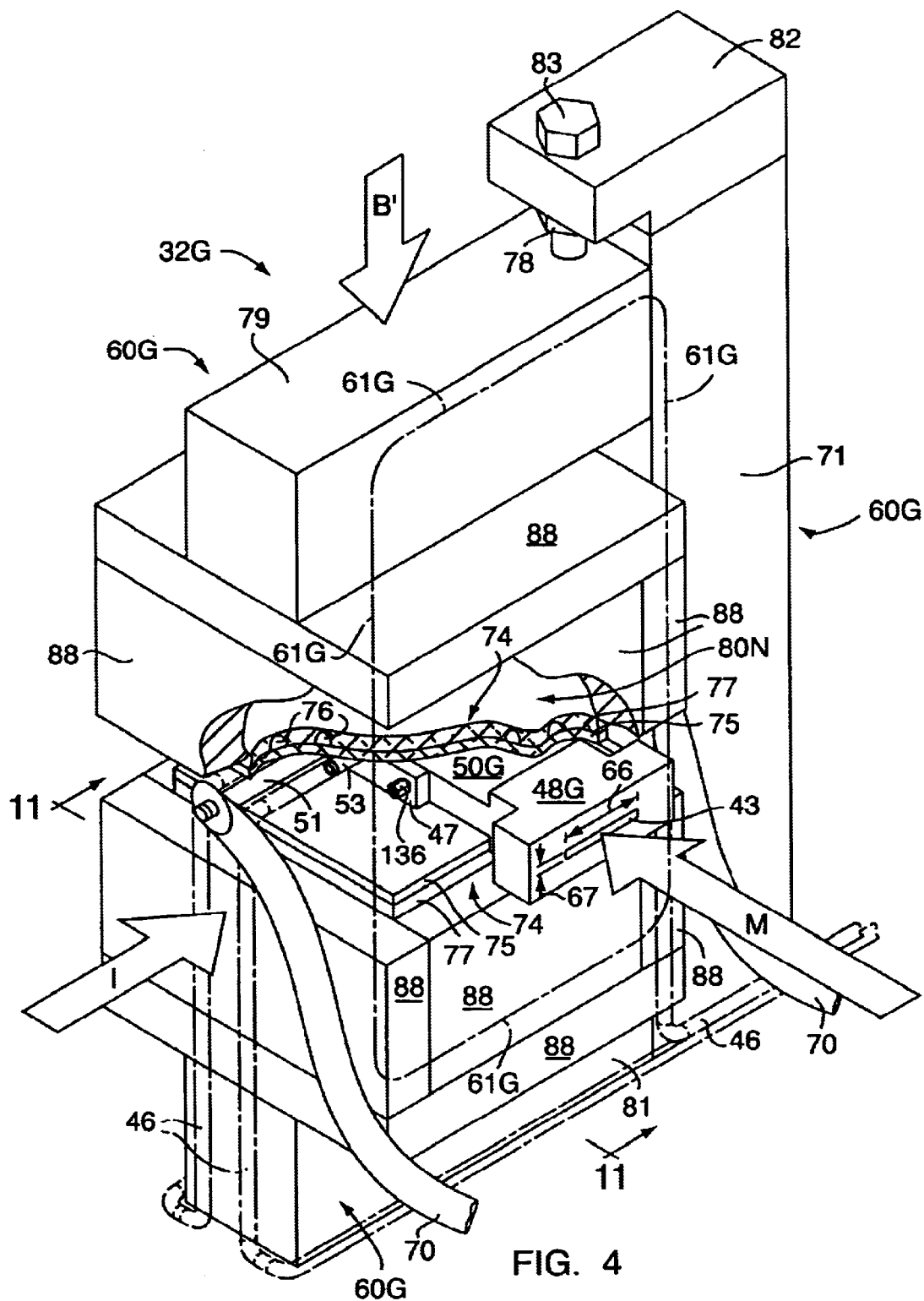
FIG. 4 is a perspective view of a concentrative, high-flux-density molten-metal pump embodying the present invention, as seen obliquely from above and looking downstream. A partial cut-out reveals an upper cooling cell and a thinned portion of a pumping conduit. For clarity of illustration, upper and lower assemblies of high-energy neo-magnets and their respective pole pieces are not outlined in this view.

General design considerations. My apparatus 32 (FIG. 2) and 32G (FIG. 4) for impelling or controlling the flow of substantial quantities of molten metal work on the Faraday-Ampére principle in its motor mode, to convert electrical energy into mechanical kinetic energy of the molten metal in a passage 43 of of a pressure conduit 48 (FIG. 2) or 48G (FIG. 4). The apparatus 32 or 32G is most characteristically a pump, but it is readily reversible electrically and so can be used as a brake or throttle or for reverse-direction pumping.

The gap 44 or 44G should be made as short as possible, both for economy of magnetic material and for minimizing magnetic leakage. For my experimental purposes to date, a gap 44 (FIGS. 2A, 3 and 3A) and a gap 44G (FIG. 11) of about 38 mm (about 1.5 inches) has been feasible and successful. These gaps 44 and 44G contain non-magnetic material, and these gaps are located between a pair of magnetic poles to be described later. An immense electromagnet ordinarily would be needed to bridge such a gap 44 in a two-loop magnetic circuit, shown by dashes at 61 (FIG. 2), or to bridge such a gap 44G in a one-loop magnetic circuit shown by dashes at 61G (FIG. 4). Such a huge electromagnet is avoided by use of permanent "reach-out" magnets 56, which I also call "neo-magnets" (FIGS. 2, 7, 8, 9, 10, 11, 17) arranged and assembled in various specific powerful configurations as shown. These magnets 56 comprise permanent magnetic material which includes a "rare-earth" chemical element, for example such as neodymium or samarium. A "rare-earth" element is an element in the lanthanide-family series of chemical elements numbered 57 to 71. The desirable preferred characteristics of such permanent neo-magnet material are described in detail further below.

In summary, such "reach-out" permanent magnets, herein also called "neo-magnets", are notable for the magnetic strength they provide and for their unique energetic ability to drive their magnetic fields B to reach out across relatively wide air gaps, space gaps, or gaps of non-magnetic, i.e. non-ferromagnetic materials, while still providing an intense magnetic field B extending across such a gap. Their reach-out capability is quite superior to the behavior of ordinary magnets in a magnetic circuit having one or more gaps of non-magnetic material. (Paramagnetic materials are treated herein as non-magnetic.)

Further description and definitions of my presently preferred neo-magnets are provided later.

Construction of a first embodiment of the invention. A first embodiment of the invention in the form of an electromagnetic pump 32 is shown in FIGS. 2, 2A, 3 and 3A. This pump is capable of exerting a flux density of about 7,000 to 7,500 gauss (about 0.7 to 0.75 tesla) throughout an area of about 26 square centimeters (about 4 square inches) extending across a non-magnetic gap 44 of about 38 mm (about 1.5 inches). A central part of pump 32 is a straight, thin-walled pressurizing conduit 48 comprising a passage 43. This pressurizing conduit 48 preferably is relatively thin-walled and flattened, for example having a narrow, straight, and substantially constant cross-sectional passage 43 throughout its working area 50. Passage 43 is shown having a height 67 (FIG. 3A) of about 5.5 mm (about 0.22 of an inch) and width 66 (FIG. 3A) of about 51 mm (about 2 inches). Thus, passage 43 has a cross-sectional area of about 2.8 square centimeters (about 0.44 of a square inch). The pressurizing conduit 48 is here depicted as horizontal, though any orientation of the apparatus 32, 50 is workable. Conduit 48 comprises non-magnetic material which resists the heat, corrosion and erosion of the molten metal M moved through pipe 36 (FIG. 1). For pumping metals of lower melting points, calcium silicate is suitable; also a non-magnetic metal such as austenitic stainless steel is suitable for forming conduit 48.

Figure 2:
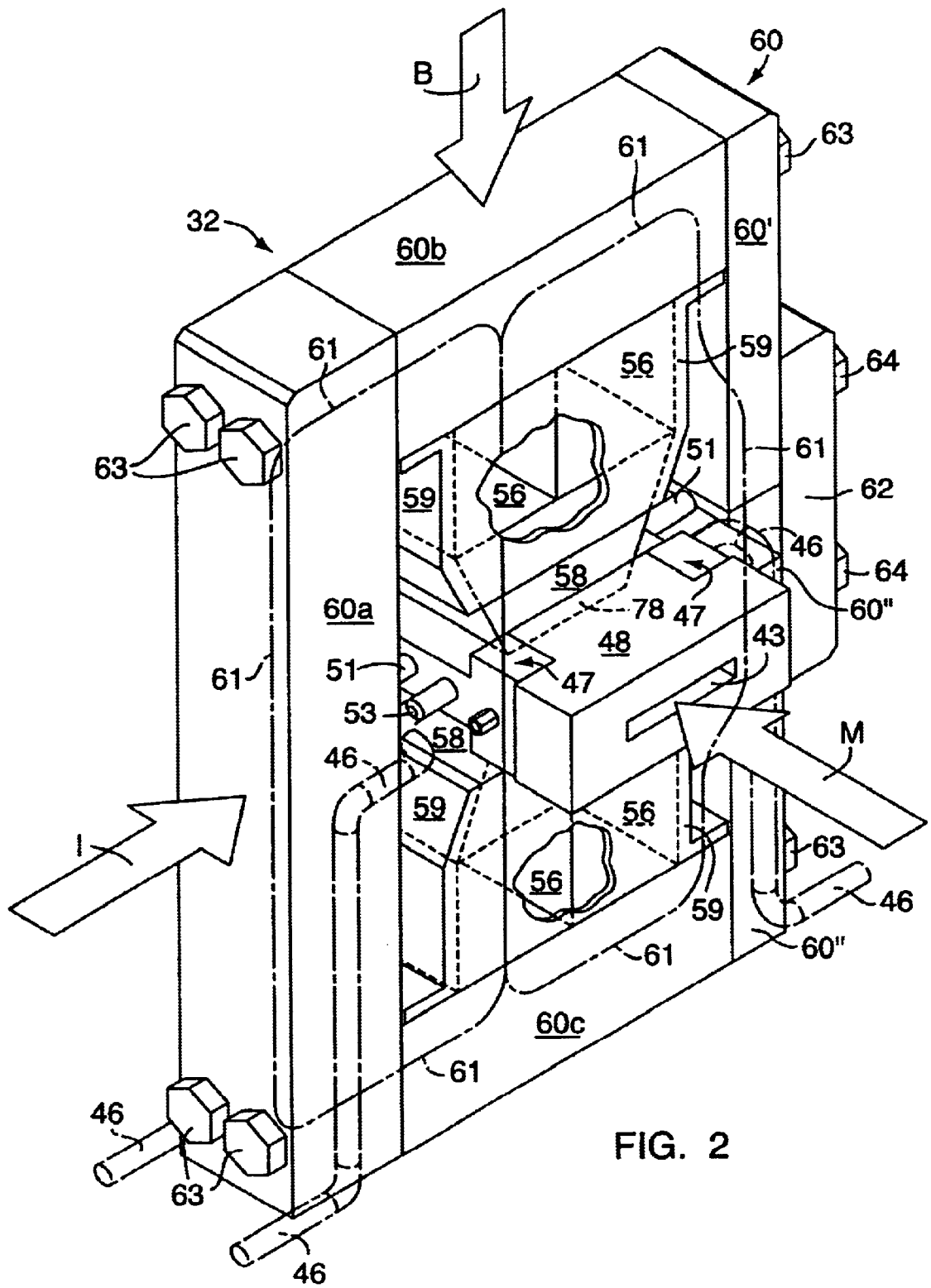
FIG. 2 is a perspective view of a molten-metal pump embodying the present invention. The pump apparatus is seen from a viewpoint looking downward obliquely from above and upstream. Shown mainly in dashed outlines are four high-energy permanent neo-magnets—two in a paired arrangement above and two in a paired arrangement below the molten metal flow M, as shown more clearly in FIG. 2A. Each pair of magnets is shown assembled in FIGS. 2 and 2A with a respective tapered pole piece whose pole face is aimed toward the molten metal flow M.

The pressurizing conduit 48 has a pumping passage 43 positioned in the path of a unidirectional magnetic field of flux 54 (FIG. 3A) having flux density B. This magnetic field 54 is directed perpendicularly through the narrow (thin) dimension of flattened working area 50. In this pump 32, the magnetic field is supplied by two pairs of neo-magnets 56, each of which in this embodiment is a cube for example measuring about 51 mm (about 2 inches) along each edge. A first pair of magnets 56 with the pole piece 58 are shown above gap 44 (FIGS. 2A, 3 and 3A). This gap 44 is shown measured in a direction parallel with the axis B of the unidirectional magnetic flux 54 (FIG. 3A). A second pair of neo-magnets 56 with their pole piece 58 is positioned below gap 44. These tapered pole pieces 58 are formed of a ferrous, soft-magnetic (ferromagnetic) material, for example machinery steel described in more detail later. Each magnet pair is retained together with its pole piece 58 by a four-sided shell or jacket 59 formed of suitable non-magnetic material, for example, aluminum secured to a frame 60 by screws 52 as in FIG. 2A. These two shells 59 are configured for snugly embracing respectively the first and second pair of neo-magnets 56 together with their respective tapered pole pieces 58. The angular slope of each side of pole piece 58 is kept not more than an angle of about 30° relative to the longitudinal axis of this pole piece, because a greater angle of convergence causes an undesirable increase in leakage flux. A convergence of about 30° on only two sides of pole piece 58 is shown in FIG. 2.

A ferrous soft-magnetic (ferromagnetic) generally rectangular frame 60 encircles the neo-magnet assemblies and establishes a magnetic circuit 61 having two loops both extending across the gap 44. Machinery steel, for example comprising about 0.2 percent of carbon by weight is magnetically "soft", i.e., it is ferromagnetic and is suitable for making pole pieces 58 and frame 60. Machinery steel, for example, also is suitable for making a bridge piece 62, which is included in one loop of the two-loop magnetic circuit 61. Bridge piece 62 is removably fastened by bolts 64 to allow disassembly of the whole pump apparatus 32 for enabling removal of pressurizing conduit 48, 50.

Figure 2A:
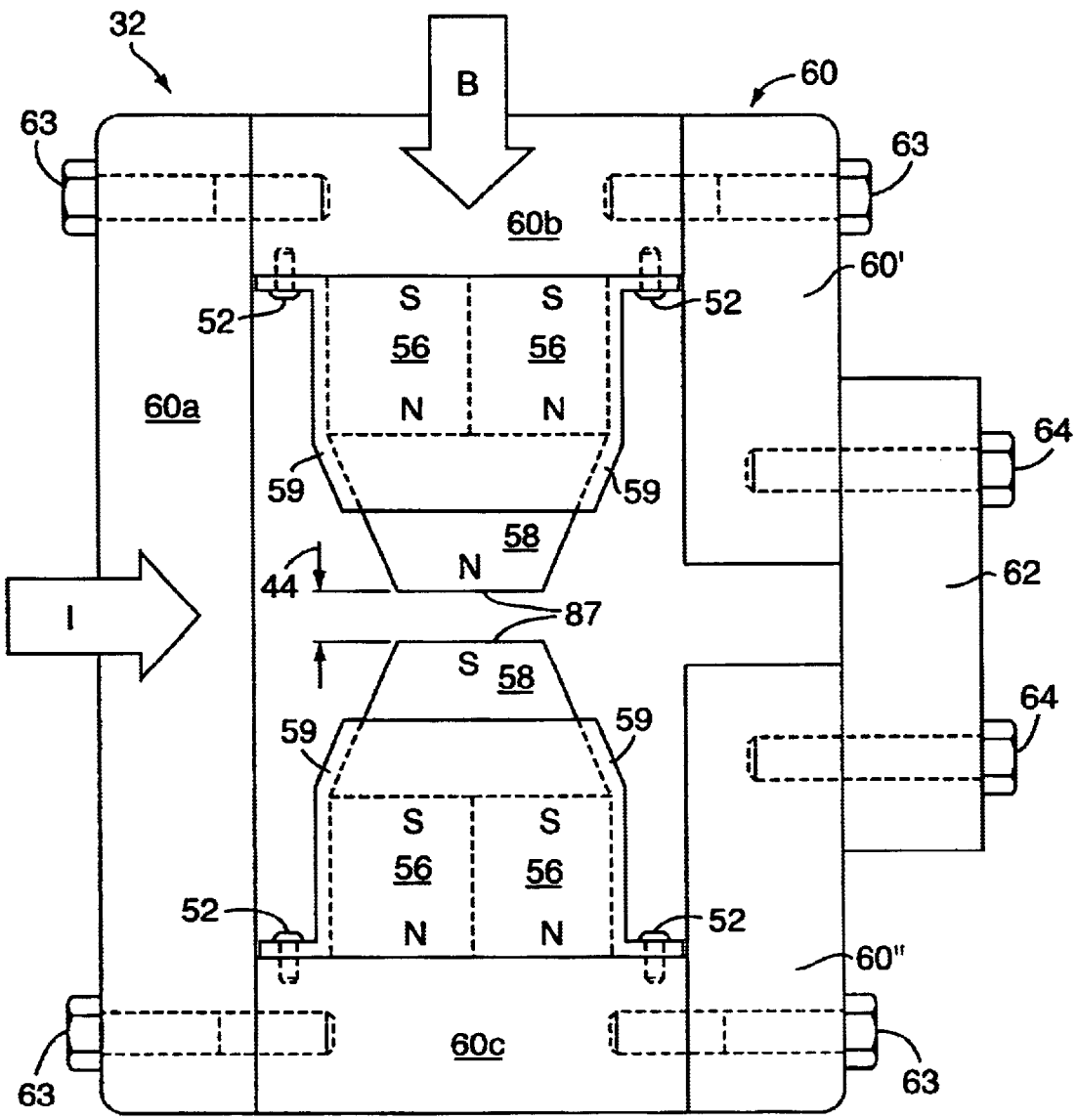
FIG. 2A is a front elevation view of the pump shown in FIG. 2. For clarity of illustration.

The upper and lower pole pieces 58 have respective upper and lower magnetic pole faces 87 (FIG. 2A). These pole faces are positioned in spaced parallel relationship and define the non-magnetic gap 44. These upper and lower parallel planar pole faces are square, measuring about 51 mm (about 2 inches) along each side, thereby each having a pole face area of about 27 square centimeters (about 4 square inches). These pole faces fit flush and snug against upper and lower parallel planar surfaces of flattened working area 50 (FIGS. 3 and 3A) of conduit 48. The magnetic polarity of the upper and lower pole faces 87 is respectively North (N) and South (S).

As explained above, vertical spacing between these parallel, planar pole faces establishes the non-magnetic gap 44 (FIGS. 2A, 3 and 3A) in the two-loop magnetic circuit 61. This gap of about 38 mm (about 1.5 inches) is substantially the same as the vertical distance between upper and lower parallel planar surfaces of working area 50.

As shown in FIG. 2, the ferromagnetic frame 60 includes an elongated upright member 60a removably fastened by bolts 63 to upper and lower transverse members 60b and 60c, respectively. These transverse members are removably fastened by other bolts 63 to upper and lower upright members 60' and 60", respectively, with bridge piece 62 bolted across a space between them.

In FIG. 3A the flux lines of a vertical magnetic field B are indicated in section by multiple crosses 54. These crosses indicate the pattern (distribution) of magnetic flux 54.

Figure 3:
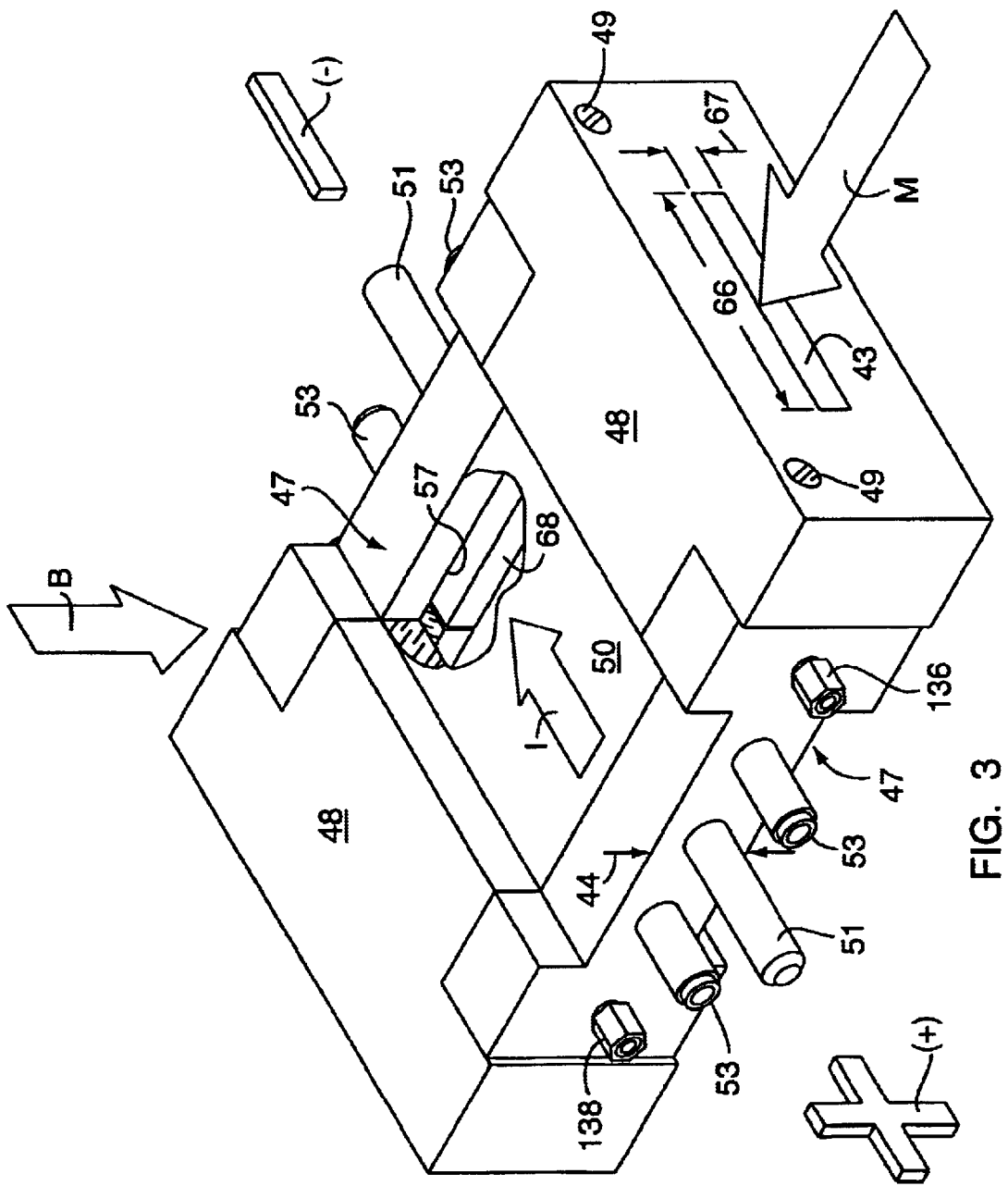
FIG. 3 is a perspective view of a pressurizing conduit and associated components in the molten-metal pump apparatus of FIG. 2 as seen looking downwardly obliquely from above and upstream.
Figure 3A:
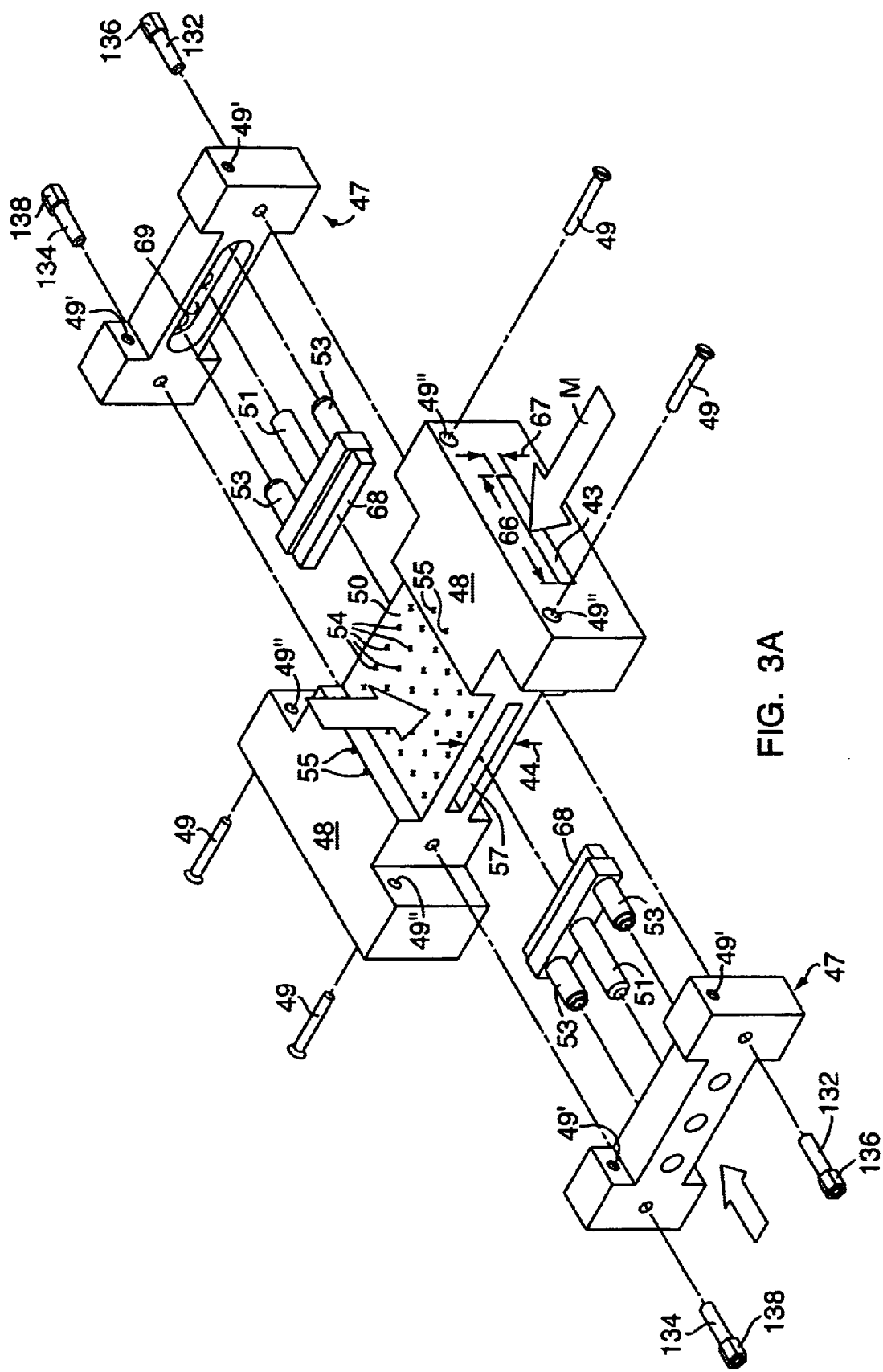
FIG. 3A is a perspective exploded view of the pressurizing conduit of the pump in FIG. 2 and associated components as seen obliquely from above and upstream. This view shows elements associated with pump electrodes and with speed-sensing electrodes. Vertical lines of unidirectional magnetic flux B are indicated by small crosses.

The crosses 55 indicate weak margins of flux pattern 54. An electrical direct current I is driven transversely through the molten metal at a low potential. In FIG. 3 this current I flows in a direction indicated by large polarity symbols plus (+) and minus (−). This direct current I travels through molten metal in the electrically non-conductive flattened part 50 of pressurizing conduit 48 and across its channel 43 within the channel's narrow vertical dimension 67 of about 5.5 mm (about 0.22 of an inch) and across its broad dimension 66 of about 51 mm (about 2 inches). The current I is conveyed to the molten metal by means of two elongated electrodes 68 (FIG. 3A) each having an electrical connection post 51 (FIGS. 3 and 3A).

The magnitude (amperage) of this direct current is suitably controlled for controlling the pumping flow rate. Increasing current I increases impelled flow rate, and vice versa. Reversing current I reverses the direction of pumping and hence reverses the impelled flow of molten metal.

The current I traverses the molten metal M inside the pressurizing conduit 48 at right angles to both the direction of flow of metal M and the direction of magnetic field B. The molten-metal-contacting portions of electrodes 68 are inserted into elongated apertures 57 in the opposite narrow sides of conduit 48. Outer portions of electrodes 68 are captured in elongated sockets 69 in two removable H-shaped electrode holders 47 which are mounted onto opposite narrow side walls of conduit 48. These holders 47 are non-conductive and non-magnetic and are secured to conduit 48 by screws 49 engaging in threaded holes 49' in the holders 47 and screw clearance holes 49" in conduit 48.

Electrodes 68 preferably are made of a carbonaceous material, for example such as graphite. Electrodes 68 of metal which is chemically different from the molten metal being pumped will likely be quickly dissolved by electrolytic action. Electrodes of the same metal as the pumped metal are not as subject to electrolytic dissolution. Metal electrodes 68 having internal cooling passages can be cooled by circulated coolant such as water flowing through tubing 46 (FIG. 2) shown in dashed outline and through nipples 53 communicating with such internal passages. This cooling not only prevents melting of metal electrodes 68, but also can cause a solidified protective cap from the molten metal to freeze upon the exposed face of each electrode. If the pressurizing conduit 48 is formed of suitable electrically-conductive non-magnetic metal, for example austenitic stainless steel, then the same current source which supplies the d.c. cross-current I may be used to preheat the pressurizing conduit by electrical resistance heating action, thereby preventing freeze-ups at the start. The employment of such metal for the pressurizing conduit 48 allows metallic electrodes 68 to be welded or brazed to the outside of said conduit and not penetrate its wall at all.

In operation, there is a steady pumping pressure along the channel of the pressurizing conduit 48, 50. By sudden reversal of the current I, the direction of pressure is reversed, instantly. This reversal is useful for braking or suddenly stopping a flow of metal, for example in repetitive starting and stopping of molten metal flow for casting a sequence of identical discrete objects in a succession of identical movable molds, which are sequentially suitably positioned and then held stationary for receiving their respective identical infillings of molten metal.

Another embodiment of the invention is shown, for example as an augmented electromagnetic pump: This augmented pump 32G (FIG. 4) differs from pump 32 in that it employs an x-y-z assembly of permanent neo-magnets 56 in a quintuply concentrative magnetic configuration 80N as shown in FIGS. 7 through 11. Another similar but inverted quintuply concentrative assembly 80S is described later. These concentrative assemblies 80N and 80S intensify magnetic flux density B' to about 100 percent above that in pump 32. They thereby exert an augmented flux density B' of about 14,000 to about 15,000 gauss (about 1.4 to about 1.5 teslas) across the non-magnetic gap 44G (FIG. 11) in which is positioned pressurizing conduit 48G having a pumping passage 43G.

Figure 5:
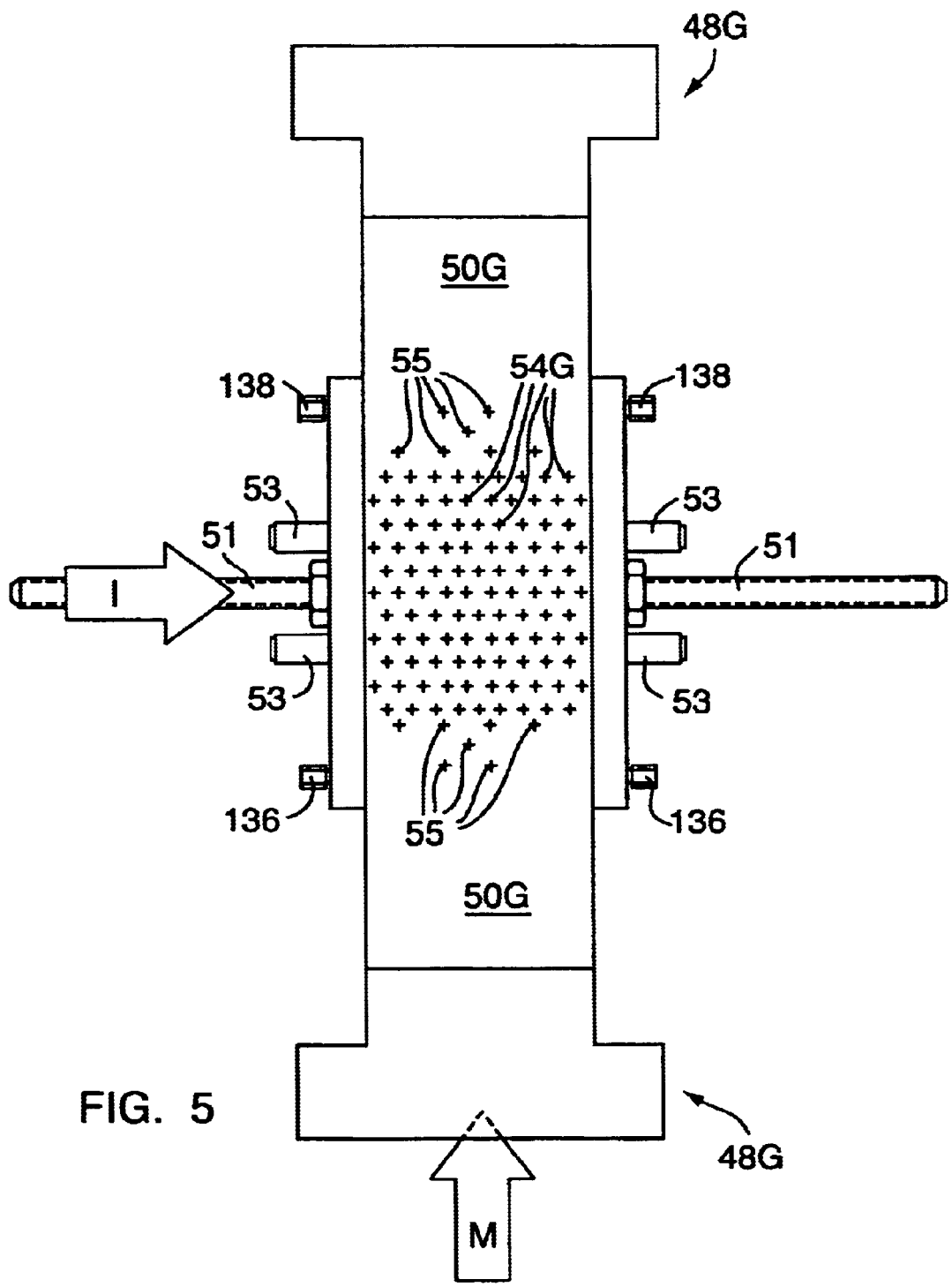
FIG. 5 is a plan view of the pressurizing conduit of the molten-metal pump shown in FIG. 4. Vertical lines of unidirectional magnetic flux are seen generally in cross section and are indicated by small crosses.

The central portion of pressurizing conduit 48G (FIGS. 4, 5, 6) comprises a flattened working area 50G. This flattened working area 50G is relatively longer than flattened area 50 (FIGS. 3 and 3A) to permit the ten cooperating neo-magnets 56 (five each in their respective concentrative assemblies 80N and 80S) with their respective pole pieces 86 to be positioned suitably close to the conduit 48G in relation to flattened area 50G. This conduit has a narrow passage 43 which preferably is relatively thin-walled and flattened, for example having a narrow, straight, substantially constant cross-sectional shape of height 67G (FIG. 4) of about 8 mm (about 0.315 of an inch) and width 66 (FIG. 4) of about 51 mm (about 2 inches). Thus, passage 43 has a cross-sectional area of about 4 square centimeters (about 0.63 of a square inch). Conduit 48G is here depicted as horizontal, though any orientation of the apparatus 32G, 48G is workable. The augmented magnetic flux 54G of field B' is directed perpendicularly through the thin dimension of flattened working area 50G. In FIG. 5 the pattern (distribution) of magnetic flux lines 54G of field B' is indicated in cross section by multiple small crosses. Crosses 55 indicate weak margins of the magnetic flux 54G.

Previously it was explained that apparatus embodying the invention is workable with passage 43 for molten metal oriented in any convenient direction relative to horizontal. For convenience of illustration, a horizontal orientation of molten metal passage 43 is shown in the drawings.

Figure 7:
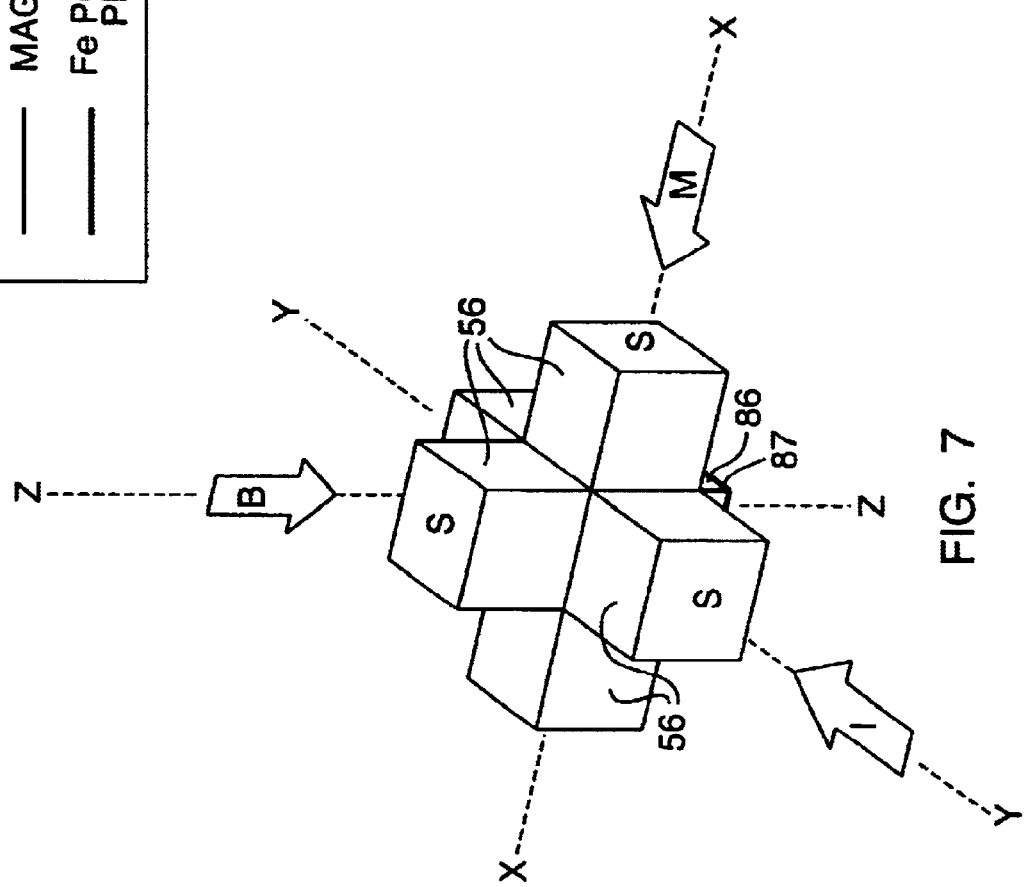
FIG. 7 is a perspective view of a quintuply concentrative, high-flux-density neo-magnet assembly which is employed in the molten-metal pump shown in FIGS. 4, 5 and 6.

FIGS. 7 through 10 illustrate the assembly 80N of five cubical permanent neo-magnets 56 arranged in a concentrative configuration together with a centrally-located ferromagnetic pole piece 86. It is noted that FIG. 7 shows mutually orthogonal axes x—x, y—y and z—z, with the axis z—z being oriented vertically for illustrative clarity. The central pole piece 86 is almost cubical, except it is elongated somewhat in the z—z direction for providing a North-polarity magnetic pole 87 which projects downward from the assembly 80N. Thus, the North-polarity square face 87 of this pole piece 86 seats down flush and snug against the working area 50G of the pressurizing conduit 48G. Technically speaking, pole piece 86 is a solid rectangular parallelepiped having square upper and lower end surfaces and four rectangular side surfaces. An upper cube neo-magnet 56 whose magnetic field is aligned with the axis z—z is seated flush on the square upper end surface of pole piece 86. Its square North-pole lower surface matches in size and shape with the contiguous square upper surface of pole piece 86.

Two cubic neo-magnets 56 magnetically aligned with axis x—x have their North-pole surfaces seated flush against opposite sides of pole piece 86. Their respective North-pole surfaces match the width of side surfaces of pole piece 86, and their top surfaces align with the top surface of the pole piece. Two other cubic neo-magnets 56 are magnetically aligned with axis y—y. Their North-pole surfaces seat flush against the two other opposite sides of pole piece 86. Their respective North-pole surfaces match the width of side surfaces of pole piece 86, and their top surfaces align with the top surface of the pole piece.

The North-polar half of the magnetomotive force in this construction is supplied by the assembled quintupally concentrative array 80N of five neo-magnets 56 (FIGS. 7 to 11, also 4). This assembly 80N is positioned within a ferromagnetic cantilevered C-frame 60G (FIG. 4). This frame 60G is made of magnetically soft, i.e., ferromagnetic, machinery steel (about 0.2 percent by weight carbon content), and this frame establishes the magnetic circuit 61G. The left side of C-frame 60G in FIG. 4 remains open to allow easy removal of pressurizing conduit 48G together with its associated components.

This C-frame 60G includes an upright elongated member 71 having an adjusting shoulder block 82 secured to its upper end. A clamp adjusting screw 83 having a lock nut 78 is threaded through this shoulder block for holding removable top clamp member 82 down firmly against a top plate of an upper ferromagnetic pot 88 to be described later. An elongated foot member 81 secured to a lower end of upright member 71 extends beneath a lower plate of a lower ferromagnetic pot 88 described later.

Figure 10:
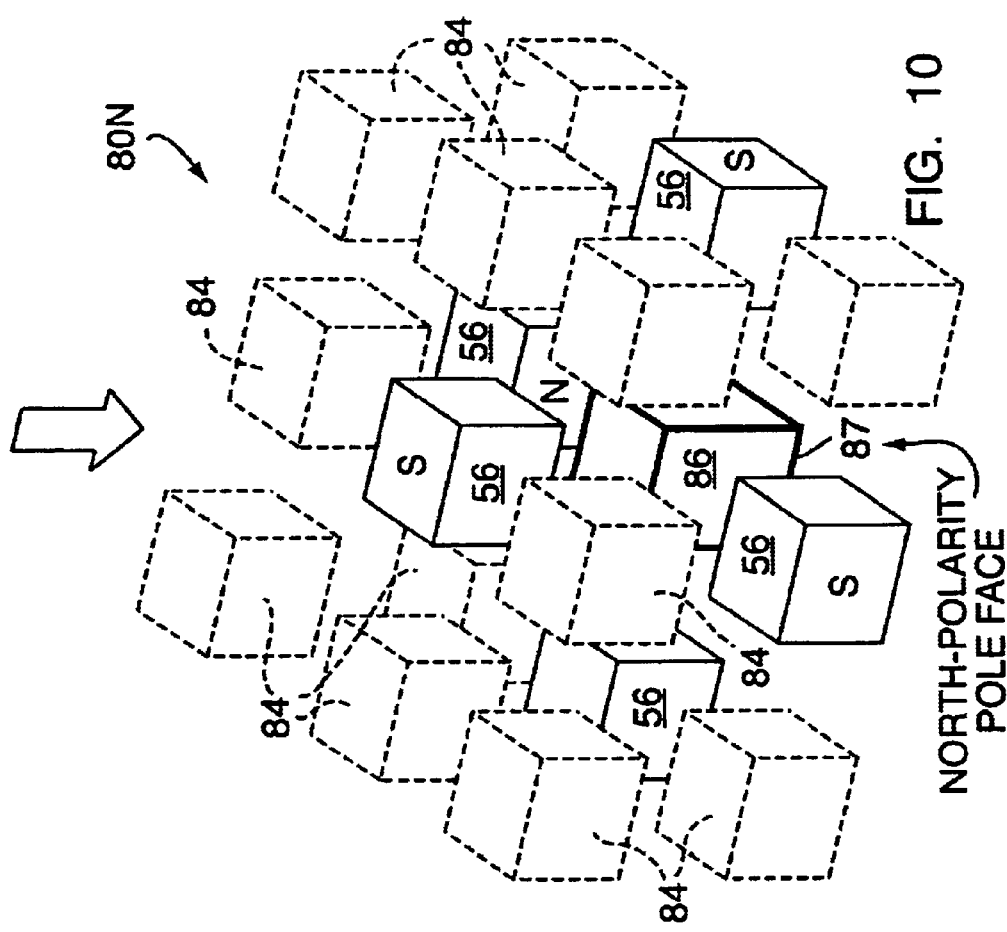
FIG. 10 is a perspective, exploded view of the elements in the assembly shown in FIG. 9.

FIG. 7 shows five neo-magnets 56 assembled with their pole piece 86 as described above. Inert filler blocks 84 (FIGS. 9 and 10) are omitted from FIGS. 7 and 8 for clarity of illustration. These inert filler blocks are cubes of the same size as neo-magnets 56 and, for example, are constructed of aluminum (Al). For distinct illustration, the outlines of twelve filler blocks 84 in FIGS. 9 and 10 are shown by dotted lines.

Figure 9:
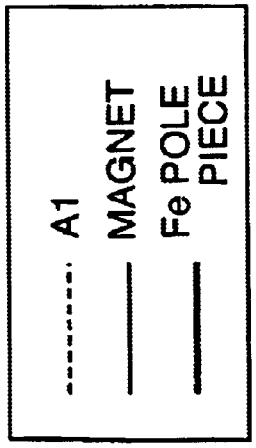
FIG. 9 is a perspective view of the neo-magnet assembly of FIG. 7 showing in dotted outline magnetically inert supportive filler blocks which are included in the assembly shown in FIG. 7, but which were omitted from FIG. 7 for clarity of illustration.
Figure 9:
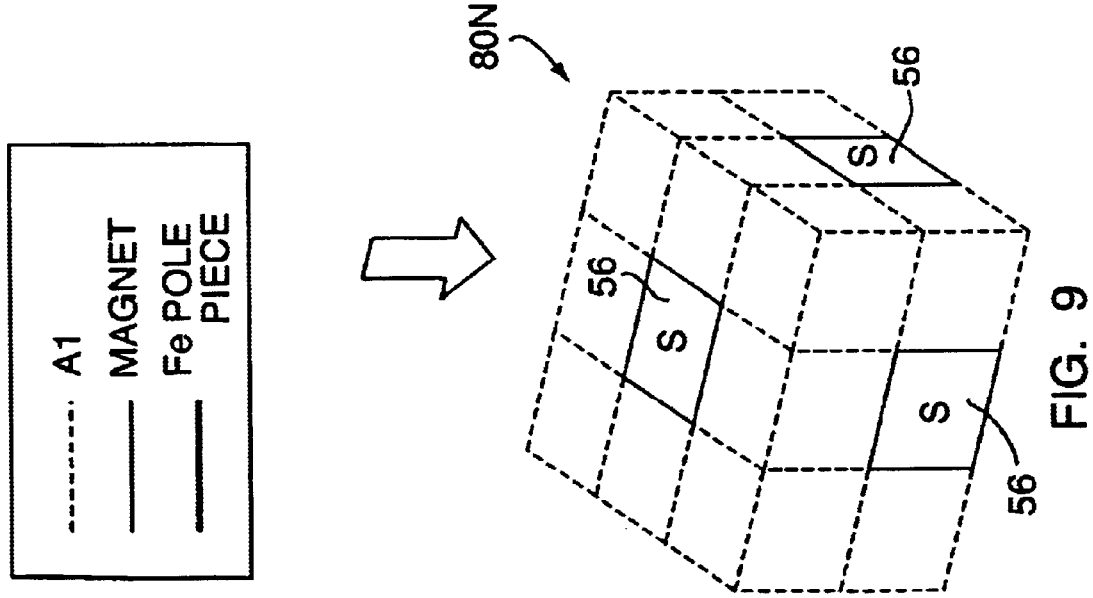

From FIG. 9, it is seen that this concentrative magnetic assembly 80N substantially comprises two layers. The upper layer contains one neo-magnet cube 56 encircled by eight inert cubes 84. In FIG. 10, it is seen that the lower layer contains the central pole piece 86 encircled by four neo-magnet cubes 56 and four inert cubes 84. The neo-magnets are contiguous with the four-side surfaces of pole piece 86 as described above. The four cubes are adjacent to the four vertical edges of the pole piece. Thus, eighteen components comprise assembly 80N.

Figure 11:
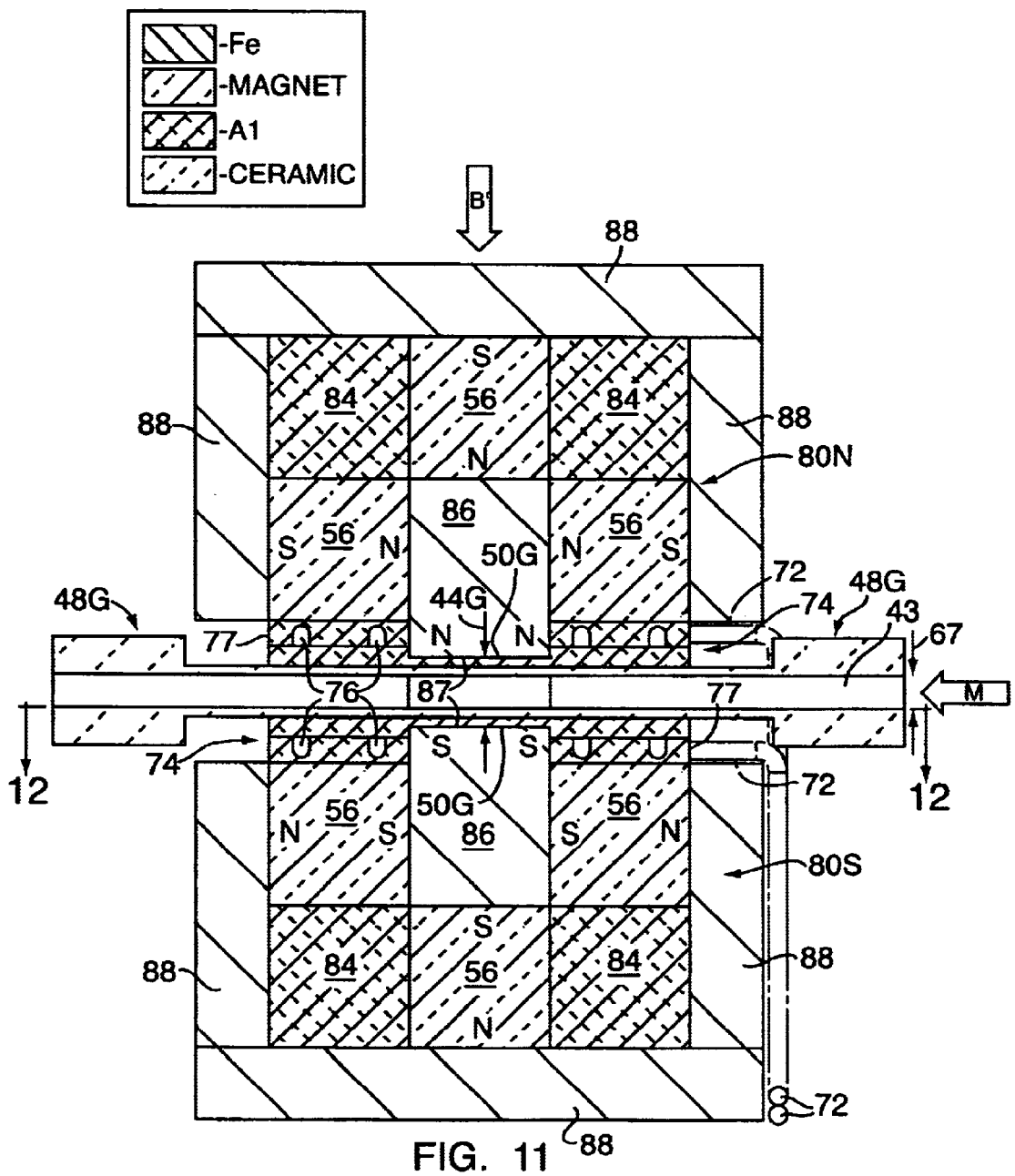
FIG. 11 is a sectional elevation view taken through the apparatus of FIGS. 4, 6 and 12 along the plane 11—11.

The South-polar half of the magnetomotive force in this construction is supplied by a concentrative magnetic assembly 80S, shown in FIG. 11. Assembly 80S is substantially the same as North-polar assembly 80N, except assembly 80S is inverted from what is seen in FIG. 11, so its pole piece 86 is in the upper layer of assembly 80S projecting above the upper layer for its South polarity face 87 to seat up flush and snug against the lower working surface 50G (FIG. 11) of the conduit 48G. Also, the five neo-magnets in assembly 80S have their South-pole faces contiguous with the South-polarity pole piece 86.

Arrays 80N and 80S are confined by respective upper and lower magnetically soft ferrous pots or enclosures or retainers 88 (FIGS. 4, 11), for example made of plates of machinery steel. Pots 88 continue the magnetic circuit 61G from frame 60G to outside faces of the five neo-magnets 56 in the concentrative assemblies. Pots 88 contact pole faces of neo-magnets 56 opposite to their pole faces in contact with their pole piece 86. In addition to providing portions of magnetic circuit 61G, the pots 88 physically retain the contained neo-magnets against their strong mutual magnetic repulsion. Pots 88 need not be everywhere closed provided that the magnetic flux is adequately channeled.

Figure 6:
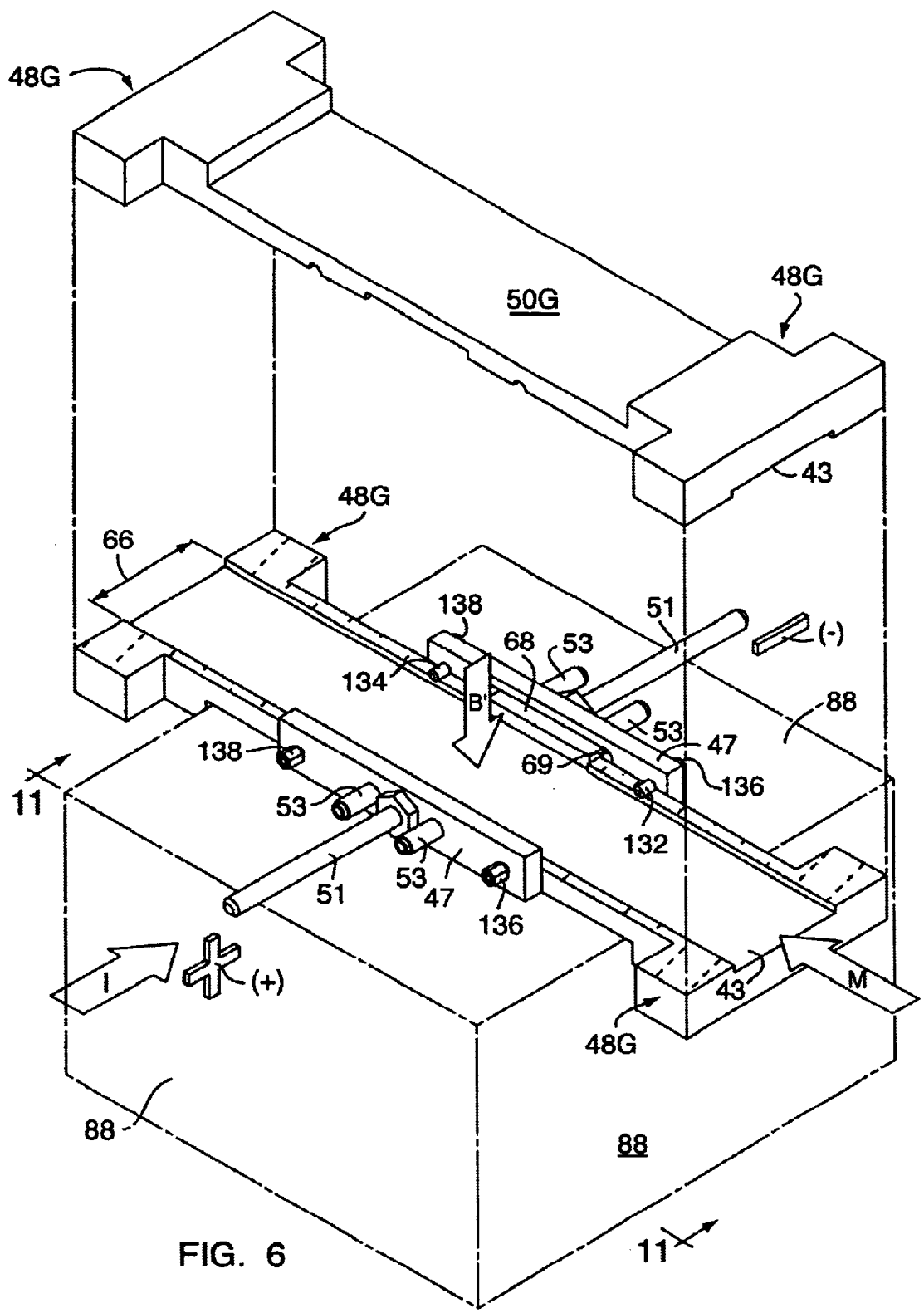
FIG. 6 is a perspective, sectioned and exploded view of the pressurizing conduit of the concentrative, high-flux-density molten-metal pump shown in FIG. 4, seen from the same viewpoint as in FIG. 4. Additionally, four speed-sensing electrodes are shown.
Figure 8:
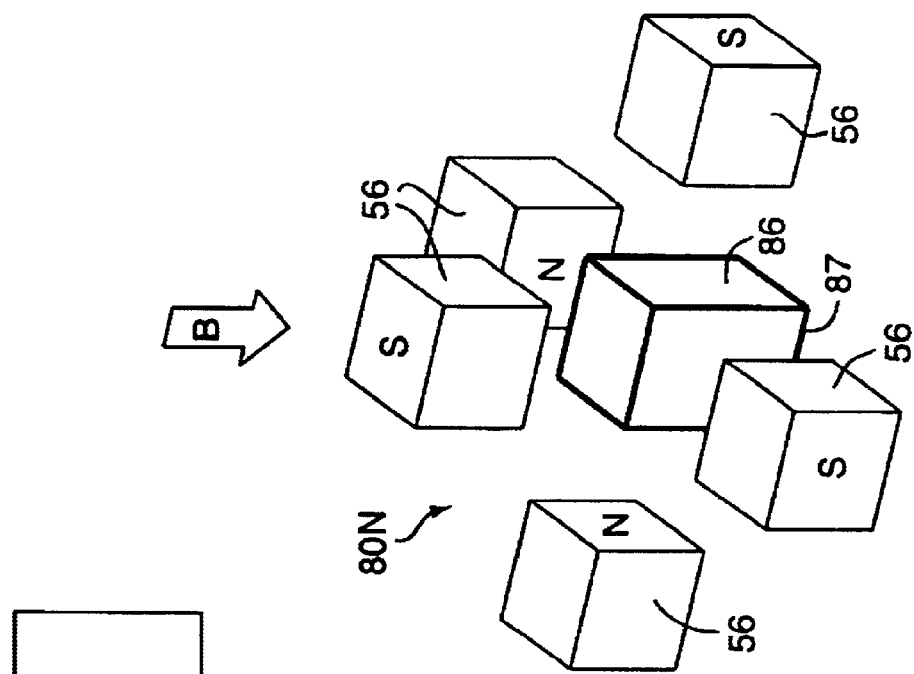
FIG. 8 is a perspective, exploded view of the neo-magnet assembly shown in FIG. 7.

Elongated electrodes 68 captured in elongated sockets 69 in holders 47 (FIG. 6) and their cooling connections 53 with coolant tubing 46 (FIG. 4) are similar to those previously described for the pump 32. An electrical direct current I is driven by those opposed electrodes 68 (only one is seen in FIG. 6) through the molten metal in the direction indicated by plus and minus symbols. Current I travels across the broad dimension 66 (FIGS. 4 and 6) of working area 50G of non-magnetic, pressurizing conduit 48G within its narrow vertical dimension 67G of about 8 mm (about 0.315 of an inch) (FIGS. 4 and 11).

Figure 12:
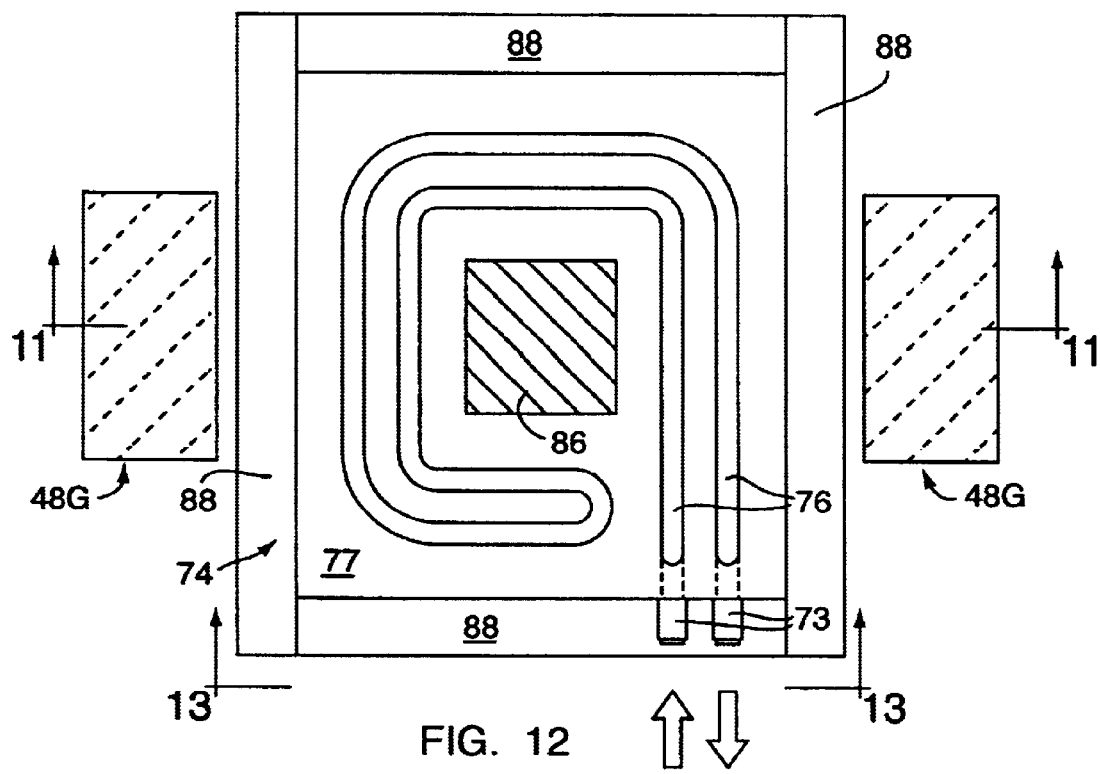
FIG. 12 is a plan sectional view taken along the plane 12—12 in FIGS. 11 and 13 for showing a laminated cooling unit which protects the neo-magnets from heat.
Figure 13:
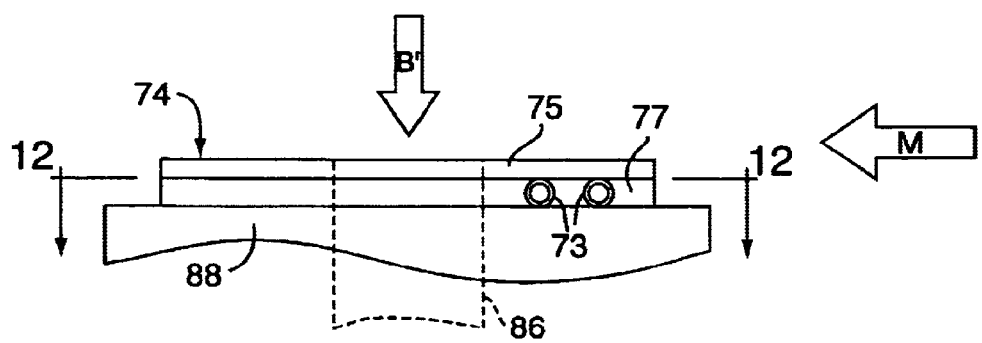
FIG. 13 is a partial side view of the elements shown in FIG. 12, as seen from the position 13—13 in FIG. 12.

A non-magnetic, heat-conductive cooling pancake cell 74 (FIGS. 11, 12 and 13) for example made of aluminum, is interposed between the magnetic array 80N and the pressurizing conduit 48G. Another such cooling cell 74 is similarly interposed with respect to magnetic array 80S. Each laminated cooling cell 74 is supplied with liquid coolant flowing through tubing 72 and nipples 73 (FIG.12) to protect neo-magnets 56 from the heat of nearby molten metal in passage 43G. Coolant such as water flows through passages 76 cut into each plate 77 to keep the rare-earth neo-magnets 56 cool enough to preserve their magnetism. There is a non-magnetic, heat-conductive thin plate 75 for covering the passages 76, for example made of aluminum. Each cover plate 75 is cemented and sealed to its adjacent plate 77.

Neo-magnetic material. My presently most preferred magnetic material for neo-magnets 56 is based on a tri-element (ternary) compound of iron (Fe), neodymium (Nd), and boron (B), which is known generically as neodymium-iron-boron, Nd—Fe—B, usually written NdFeB. Permanent magnets containing NdFeB are commercially available. These permanent reach-out neo-magnets containing NdFeB exhibit a maximum energy product in a range of about 25 to about 35 MGOe (Mega-Gauss-Oersteds).

Figure 14:
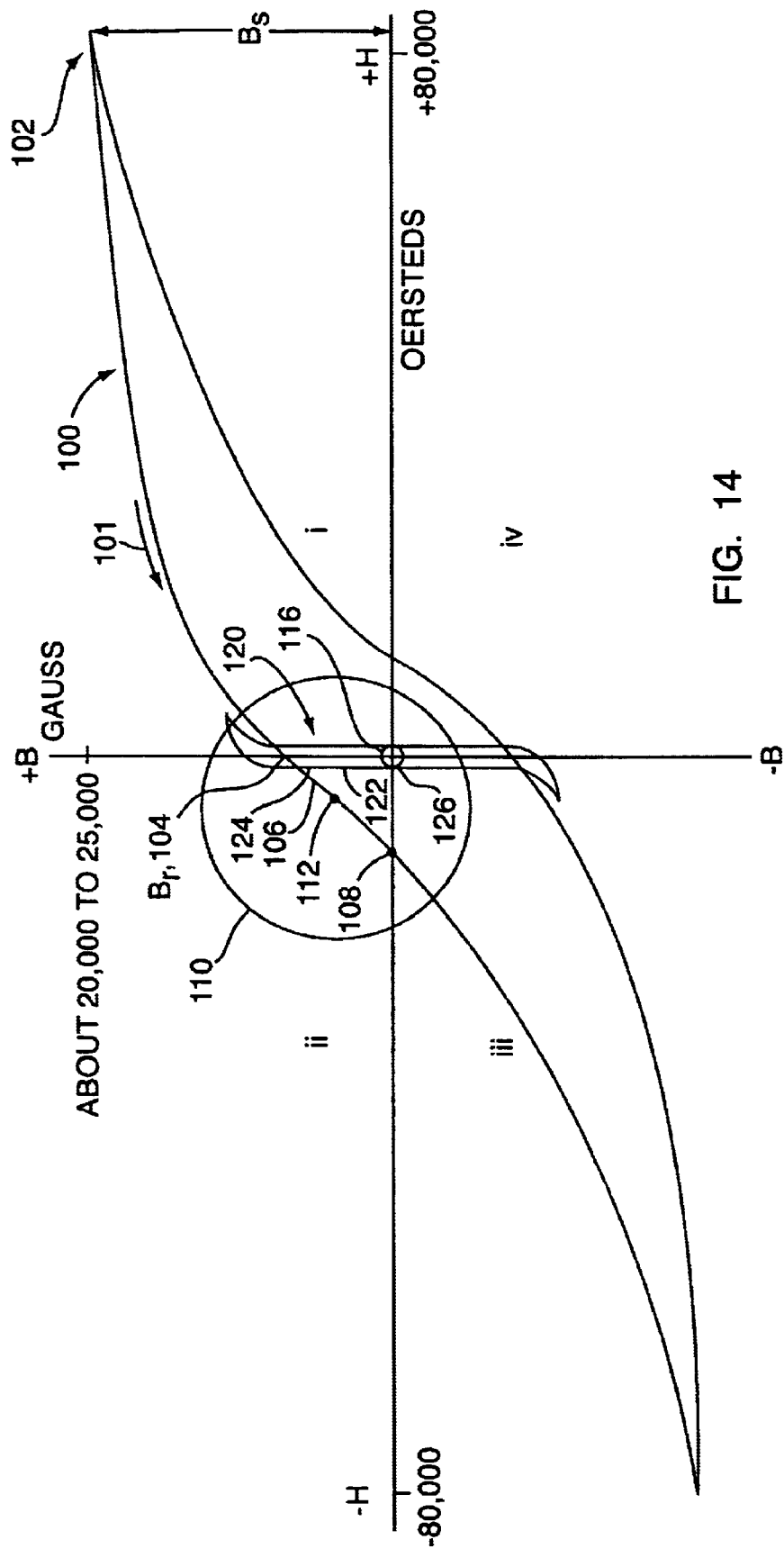
FIG. 14 shows the hysteresis loops of magnetization and demagnetization of rare-earth-containing, high-energy, permanent neo-magnetic material compared with alnico 5 permanent magnetic material.

I envision that in the future other reach-out permanent magnetic materials, for example ternary compounds such as iron-samarium-nitride and other as yet unknown ternary-compound permanent magnetic materials having a maximum energy product MGOe in said range and above said range and also having B–H characteristics similar to those as shown in FIG. 14 and being suitable for use in embodiments of this invention, may become commercially available. Also, as yet unknown four-element (quaternary) permanent magnetic materials may become commercially available having a maximum energy product MGOe in or above said range with B–H characteristics suitable for use in embodiments of this invention.

In FIG. 14, the height of the extreme right point 102 of the loop 100 (in quadrant i) represents a maximum saturation $B_s$ of a suitable neo-magnetic material for use in embodiments of my invention. This maximum saturation $B_s$ is established when a neo-magnet 56 is initially magnetized by the manufacturer. When the neo-magnet 56 is removed from a manufacturer's electromagnet, a previously imposed coercive magnetizing force H in oersteds (measured along a horizontal axis) ipso facto becomes zero. Under this condition of zero magnetizing force, the residual (i.e. self-maintained) magnetic flux density $B_r$ in gauss is represented by a point 104 along a vertical B-axis, where the neo-magent's hysteresis loop 100 crosses the B-axis. This $B_r$ value is known as the residual induction of the neo-magnet. For purposes of my invention, the residual induction $B_r$ preferably is equal to or greater than (no less than) a residual flux density in a range of about 8,000 to about 10,000 gauss (about 0.8 to about 1.0 tesla). This high value and even higher values of residual induction $B_r$ are attainable with neo-magnetic material preferred to be used for constructing embodiments of the invention. It is more preferred to use neo-magnets having a residual induction $B_r$ in a range of about 10,000 to about 12,000 gauss (about 1.0 to 1.2 tesla) and most preferred to have $B_r$ above about 12,000 gauss (about 1.2 tesla).

It is noted that about the same high residual induction also is attainable with alnico 5, a permanent-magnetic material which has long been cheaply available and whose approximate hysteresis loop (B–H curve) is shown at 120 in FIG. 14. This slim alnico 5 loop crosses the B axis at a residual induction $B_r$ of about 12,800 gauss (about 1.28 teslas), as measured from an alnico 5 hysteresis loop shown in FIGS. 6–3 of the above-listed reference book by Moskowitz. This residual induction of alnico 5 magnet material is not far different from that of neo-magnetic materials; however, alnico 5 magnets are not practical nor suitable for use in embodiments of this invention, as will be explained later.

The suitability of neo-magnets, for example NdFeB neo-magnets, arises not only from their high residual induction $B_r$ (FIG. 14), but more importantly from their low differential demagnetizing permeability as shown by the low slope $\Delta B/\Delta H$ of the portion 112 of their demagnetizing curve 106. This portion 112 of demagnetization curve 106 is located within circle 110 in the second quadrant "ii" of the B–H plot. This demagnetization curve portion 112 extends from a first point 104 where demagnetization curve 106 crosses the +B axis at its value on the +B axis scale, to a second point 108 where this demagnetization curve 106, crosses the –H axis (minus–H axis) at its value on the –H axis scale. The low slope $\Delta B/\Delta H$ is herein defined as being the slope of curve portion 112 as measured midway along this curve between its two points 104 and 108, namely, its "midpoint differential demagnetizing permeability," which is shown in FIG. 14 as being about 1.15.

This unique reach-out ability of a high-energy permanent neo-magnet 56 to drive an intense magnetic field B through a non-magnetic gap 44 (FIGS. 3 and 3A) or 44G (FIG. 11) in a magnetic circuit, (for example as shown at 61 (FIG. 2) and as shown at 61G (FIG. 4) may be understood by considering or thinking that such a magnet functions internally—incidentally but inherently—as its own non-magnetic gap, i.e. as a gap which does not contain ferromagnetic material. In other words, such a magnet functions as though it comprises an internal virtual gap corresponding almost to the cumulated length of the neo-magnet 56 itself as measured in the direction of the magnetic flux. Hence, the addition of a somewhat comparable exterior, real, physical, non-magnetic gap, for example such as gap 44 or 44G, does not cause much reduction of the flux 54 shown in cross section by multiple small crosses in FIGS. 3A and 5 in the magnetic circuit 61 (FIG. 2) or 61G (FIG. 4), i.e. does not cause much reduction in intensity of the magnetic field B being driven across such a relatively long gap in such a magnetic circuit.

For the purposes of my invention, the slope at a midpoint 112 along the demagnetization curve 106 is preferably equal to or less than about 4 and more preferably is less than about 1.2, whereas the magnetic permeability of air or vacuum is unity by definition. In FIG. 14, the slope at point 112 is shown as being about 1.1, which in my experience is provided by commercially available NdFeB neo-magnets. The smallness of this slope reflects a magnetic "hardness", an abiding, intrinsic residual magnetism. This preferable slope relatively close to unity is called differential demagnetizing permeability measured in $\Delta$gauss per $\Delta$oersted.

A practical suitable parameter of a preferred neo-magnet 56 parameter which parameter tends to track the desired reach-out characteristic is called the maximum energy product; it is the product of residual induction $B_r$ at midpoint 112 multiplied by an amount of demagnetizing oersteds required to bring the residual induction $B_r$ of a neo-magnet 56 down from the point 104 on the B axis to the midpoint 112. This product is expressed as Mega-gauss-oersteds (MGOe), a common commercial designation. As scaled in FIG. 14, a neo-magnet so depicted would have at least about 25 Mega-gauss-oersteds of energy product. It is preferred to use neo-magnets having the highest values of MGOe which is reasonably economically obtainable, for example at least about 30 MGOe to about 35 MGOe and above. By contrast, alnico 5 is not suitable.

A demagnetization curve 122 for alnico 5, shown within a circle 110 (FIG. 14), drops almost vertically at a slope of about 30 $\Delta B/\Delta H$, and this demagnetization curve 122 crosses the H axis at a point 126 having a value less than about 1,000 oersteds. A suitable neo-magnet, by contrast, has a demagnetization curve 106 that usually is a relatively straight line 106 of much less slope, extending between points 104 and 108, whose slope $\Delta B/\Delta H$ is relatively close to unity.

Figure 16:
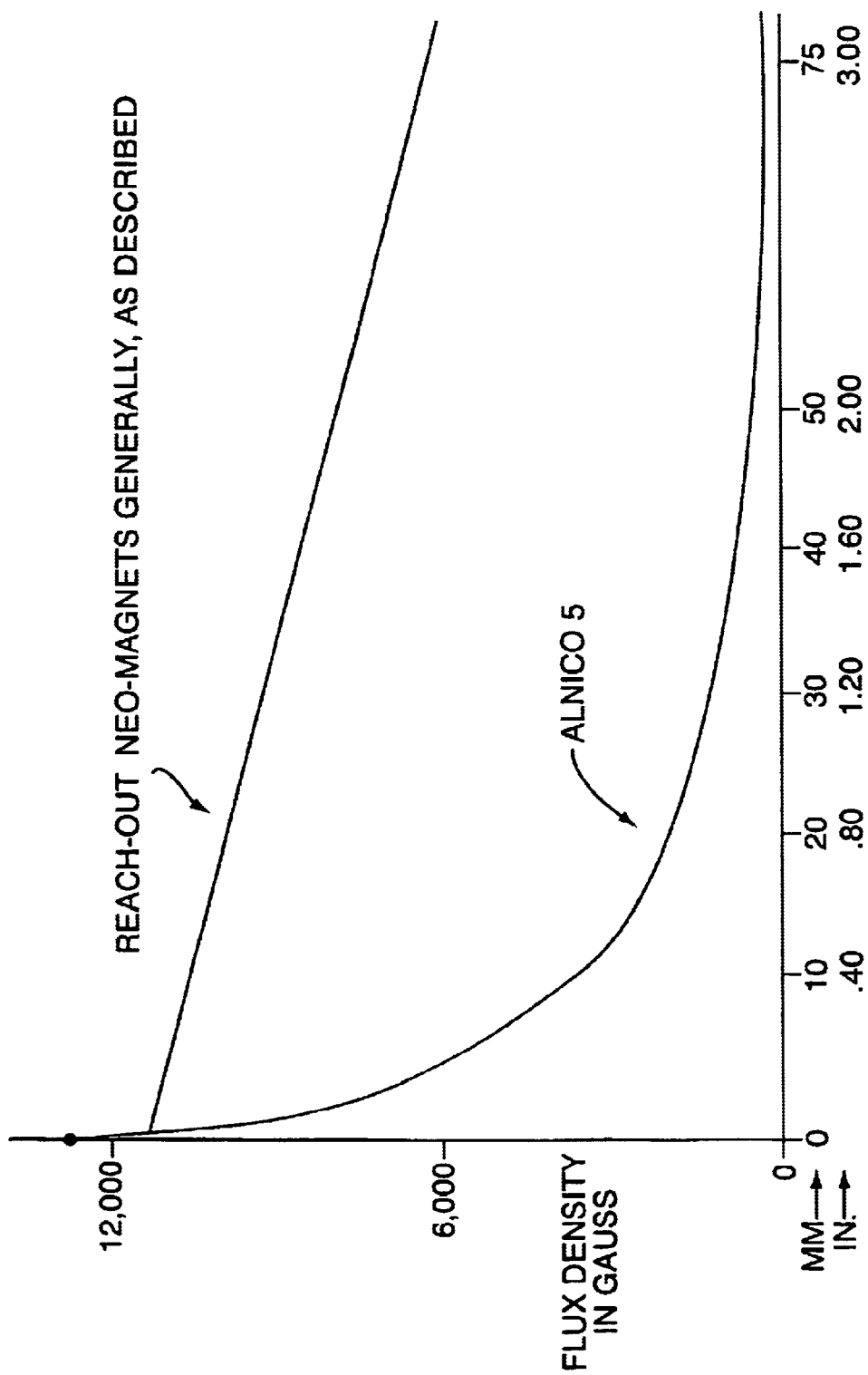
FIG. 16 illustrates the reach-out attraction force capability of "reach-out" neo-magnets exerted through a relatively large non-magnetic gap as compared to the rapid, undesirable decrease of attraction force exerted by alnico 5 magnets through the same non-magnetic gap.

In FIG. 16, the two curves contrast the flux densities (y-axis) obtained with alnico 5 and reach-out neo-magnets. The independent variable (x-axis) is the thickness or length of the non-magnetic gap in their respective magnetic circuits. The effect of a given gap is different for different sizes and configurations of magnetic assemblies; here the gap is shown plotted to correspond to the apparatus herein described.

Available commercial magnets 56 which can be used in embodiments of the invention comprise a mixture of cobalt and samarium ($Co_5Sm$) having a maximum energy product of about 20 MGOe and a residual induction $B_r$ of about 9,000 gauss (0.9 tesla) and an almost-unity midpoint differential demagnetizing permeability of about 1.08. Also, available commercial magnets which can be used contain cobalt-samarium material ($Co_{17}Sm_2$) and have a maximum energy product of about 22 to about 28 MGOe and a residual induction $B_r$ in a range of about 9,000 gauss (about 0.9 tesla) to about 11,000 gauss (about 1.1 tesla) and an almost-unity midpoint differential demagnetizing permeability in a range of about 1.15 down to about 1.0.

A limitation on the magnetic flux density attainable in the nonmagnetic gap 44G is the ability of the pole piece 86 to carry it. For iron as nearly pure as machinery steel, magnetic saturation is said to occur at about 2.1 tesla. If about a third of the iron is replaced by an equal alloyed part of cobalt, this limit is said to rise to about 2.4 tesla (see Douglas, pp. 761–763, listed above). However, in my experience, these limits are not reached in the nonmagnetic gap 44G more closely than approximately 70 percent because of substantial leakage flux occurring around the neo-magnets themselves. This magnetic leakage is due to the magnetic reluctance of the nonmagnetic gap 44G.

Figure 13A:
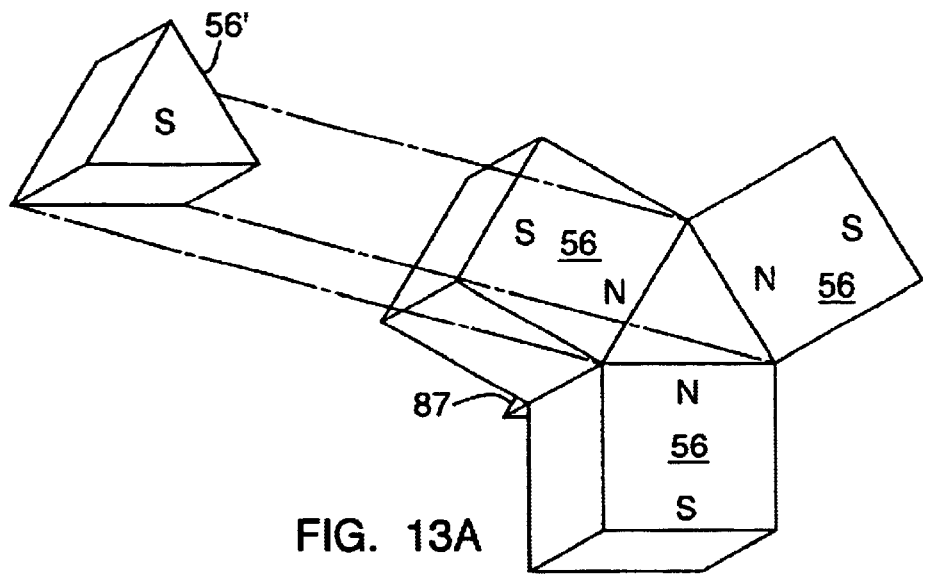
FIG. 13A is a perspective view of a triangular pole piece with its three surrounding magnets. Its end magnet is shown in exploded relationship.
Figure 13B:
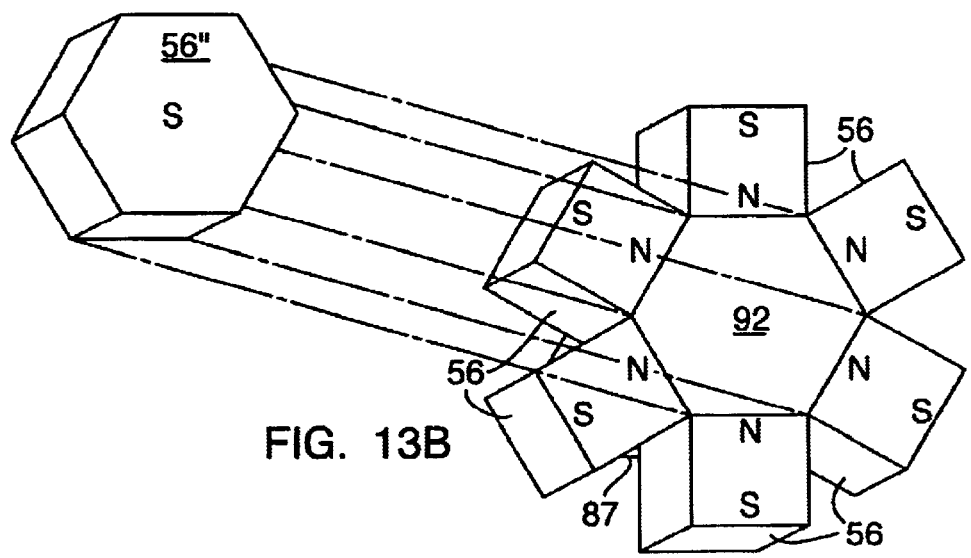
FIG. 13B is a perspective view of a hexagonal pole piece with its six surrounding magnets. Its end magnet is shown in exploded relationship.

Input to the parallelepiped pole piece can be provided also, for instance, from 1, 2, 3, 4, 5, 6, 7 or more sides, with each side of such pole piece being snugly adjacent to the pole face of each neo-magnet 56 concerned. In general, the more sides of a pole piece receiving magnetic input, the better. For the case of a pole piece 91 of three symmetrical sides plus two ends, the pole piece would be of triangular cross-section (FIG. 13A). A triangular end-cap neo-magnet 56' can be added, and the other end of pole piece 91 is its North pole face 87. For the case of six sides plus two ends, the pole piece 92 would be of hexagonal cross-section (FIG. 13B). A hexagonal end-cap neo-magnet 56" can be added. The other end 87 of pole piece 92 is its North polarity pole face.

Figure 13C:
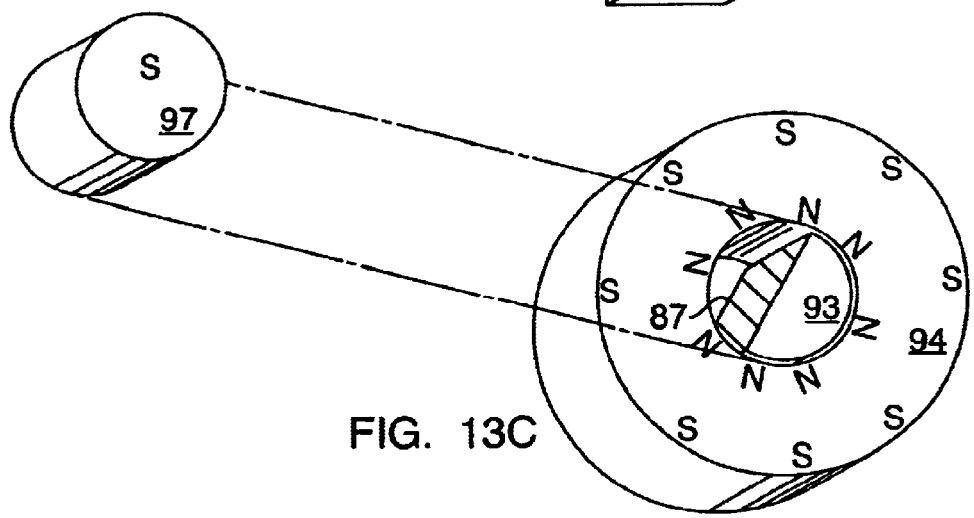
FIG. 13C is a perspective view of a circular pole piece in its unitary ring magnet and its end magnet shown exploded.

As a limiting case, a circular cylindrical pole piece 93 (shown half in section) is surrounded by an annular magnetic ring 94 magnetized in the direction through its radial thickness throughout, as is shown in FIG. 13C. A circular cylindrical cap 97, magnetized longitudinally in a direction along its cylindrical axis completes this magnetic assembly. The other axial end 87 of pole piece 93 is its North polarity pole face. None of the non-square cross-sectional shapes shown in FIGS. 13A, B and C drives a square magnetic field through the passage 43 or 43G; hence, some fringes of the imposed magnetic field are outside of the width dimension 66 of passage 43 or 43G, and some fringes are upstream and downstream of the electrodes. However, this non-square magnetic field does not result in eddy-leaks of molten metal at the edges of the pumping action in passage 43 or 43G because the current I flowing between straight, parallel opposed electrodes covers very nearly a square or rectangular area extending across passage 43 or 43G, with the result of uniform pumping force across the flow channel.

Figure 17:
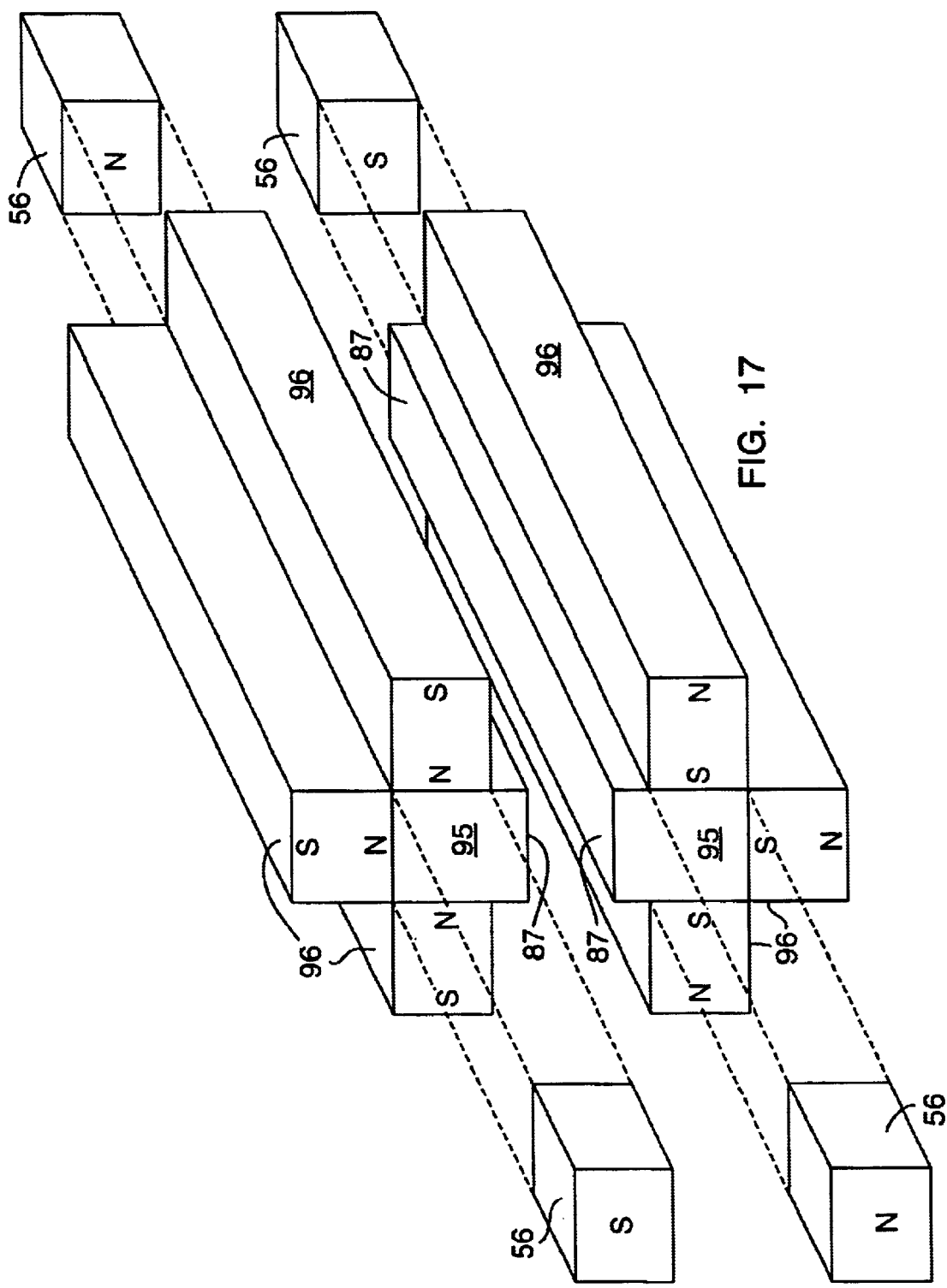
FIG. 17 is a perspective view from above of a long triple-input magnetic configuration. The end magnets are shown in exploded relationship.

FIG. 17 shows an assembly of two elongated pole pieces 95 each with four long sides. Three sides of each pole piece are supplied with magnetic flux by three long neo-magnets 96, and the fourth side is an elongated pole face 87. Such a long pole face 87 can be oriented transversely relative to metal flow for use, for example, with an extra-wide-dimension 66 pumping passage. Small neo-magnets 56, shown in exploded relationship, can be applied to the ends of each elongated pole piece 95 to make a total of 5 neo-magnets for each pole piece if desired, unless magnetic flux leakage at the two ends of each long pole piece may be ignored.

In general, for obtaining suitable economic and practical results, an electromagnetic pump design embodying the present invention will be arranged to minimize magnetic leakage and stray magnetic flux so that the great magnetic energy and the reach-out capability of neo-magnets will provide an intense magnetic field B extending across the non-magnetic gap 44, 44G and 44J (FIG. 19) and passing through the pressurizing conduit positioned within this gap. Thus, for example, this non-magnetic gap 44, 44G and 44J is minimized insofar as is reasonably practicable.

Adjacent neo-magnetic elements with the same orientation of poles may be assembled together and treated as effectively one magnet. For example, eight cubic neo-magnets measuring one inch along each edge can be assembled into a cubic configuration measuring two inches along each edge. In general, the neo-magnets will repel each other when so assembled and hence need to be constrained against their mutual repulsion.

Flow sensing. Any one of various kinds of metal-level-sensing apparatus at the casting machine as known in the art may send a signal for indicating level or limits of molten metal in the casting apparatus. Advantageously, such a signal can be fed to a control for a DC power supply which is providing current I for controlling magnitude (amperage) of this current for controlling pumping rate for conforming to the level or limits of the casting machine or mold, without either overflowing or allowing voids or cold-shuts to occur in the cast metal. One suitable proximity coil device for signaling molten-metal level in a continuous casting machine is described in U.S. Pat. No. 4,138,888 of Sten V. Linder.

One or more pairs of small additional embedded passive sensing electrodes 132 and 134 (FIG. 3A) with respective connectors 136 and 138 (FIGS. 3A and 5) protrude through the wall of a fluid pressurizing conduit to contact the molten metal flow M (FIGS. 5, 3A, 3, 2, 4).

Where magnetic flux penetrates a conduit, moving liquid metal in the conduit generates an e.m.f. at right angles both to the flux and the flow, according to the Faraday principle in its generating mode whereby mechanical energy is converted into electrical energy. The signal is proportional to the rate of flow passing between two electrodes 132 and again between the other two electrodes 134. These passive sensing electrodes 132 and 134 (FIGS. 5 and 3A) respectively define paths across the relatively weaker fringes 55 or 55G of the magnetic field 54 or 54G which is driving the molten metal. Two pairs 132 and 134 of electrode sensors are shown positioned upstream and downstream of the working area 50 and 50G. The electrical outputs from these two pairs of electrodes are combined and averaged. The average electrical output from these sensors is fed to a meter (not shown) suitable for enabling manual control of DC current I or is fed into a DC current control (not shown) to stably and precisely control the pump 32 or 32G or else to operate the apparatus 32 or 32G as a brake, or throttle. Hence, the advantageous ability of embodiments of the invention to match molten-metal input to the speed of a continuous metal-casting machine is realized.

Either pair of electrodes 132 or 134 would be sufficient for the purpose of control, except notably that the necessarily fluctuating DC driving current between nearby electrodes 68 and the associated changing magnetic field of the fluctuating current creates undesired e.m.f's between the pairs of sensing electrodes 132 or 134. However, a symmetrical upstream-downstream location of sensing electrodes with respect to the DC-current driving electrodes 68 causes the undesired e.m.f's to cancel each other and so not disturb the generated and combined control e.m.f. to be fed into a meter or a DC current control.

Instead of using the fringe field 55 or 55G for generating an e.m.f. according to the Faraday principle in its generating mode, separate magnets may be used, suitably positioned upstream or downstream from the fringe field for providing a magnetic field passing through the molten metal flow in a direction parallel with field B. In this event, only one pair of sensing electrodes like those identified above is sufficient.

Figure 18:
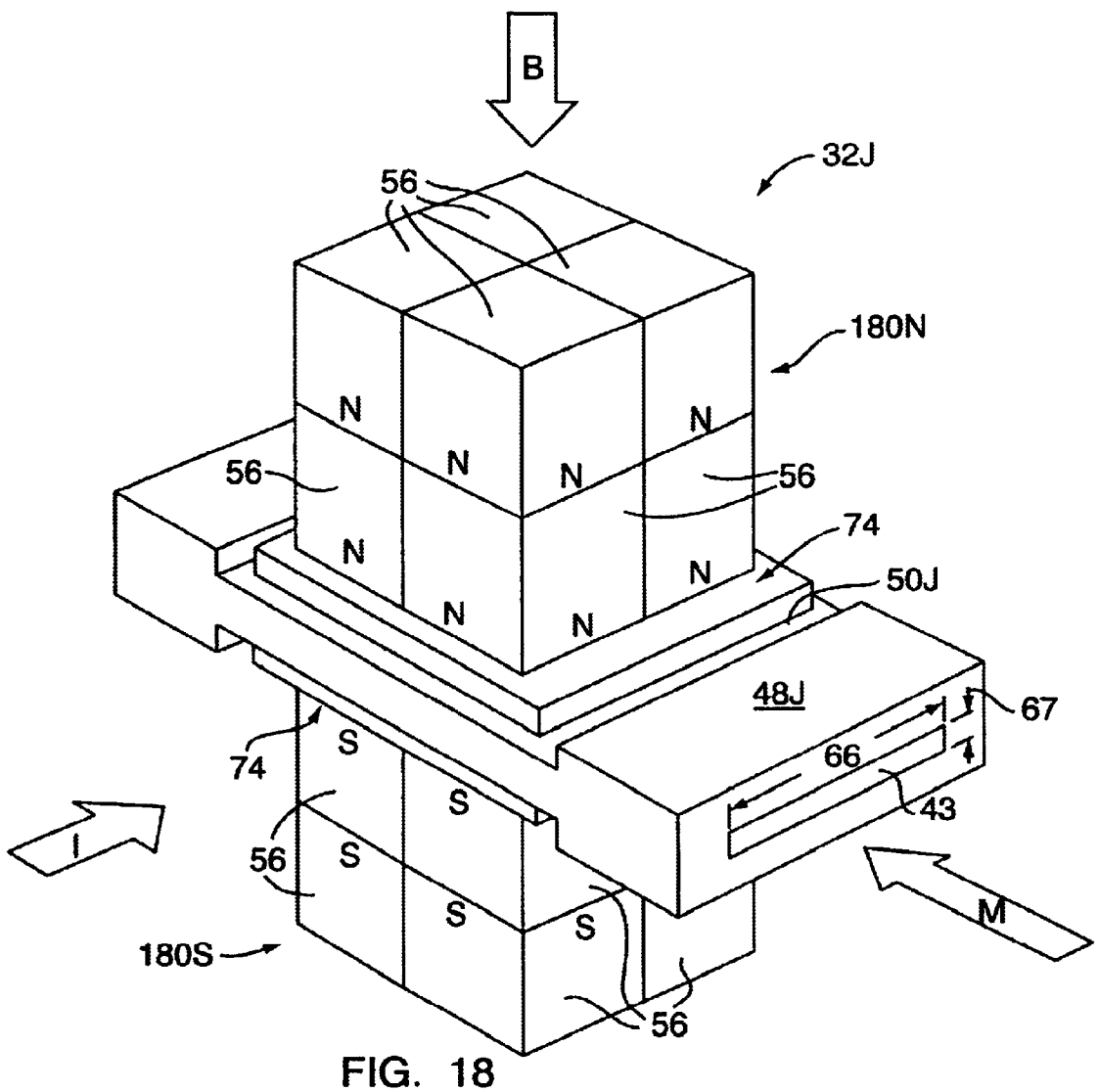
FIG. 18 is a perspective view showing another embodiment of the invention including two cubical assemblies of eight neo-magnets each. The pressurizing conduit and two pancake coolers are shown positioned between these two cubical assemblies of neo-magnets.
Figure 19:
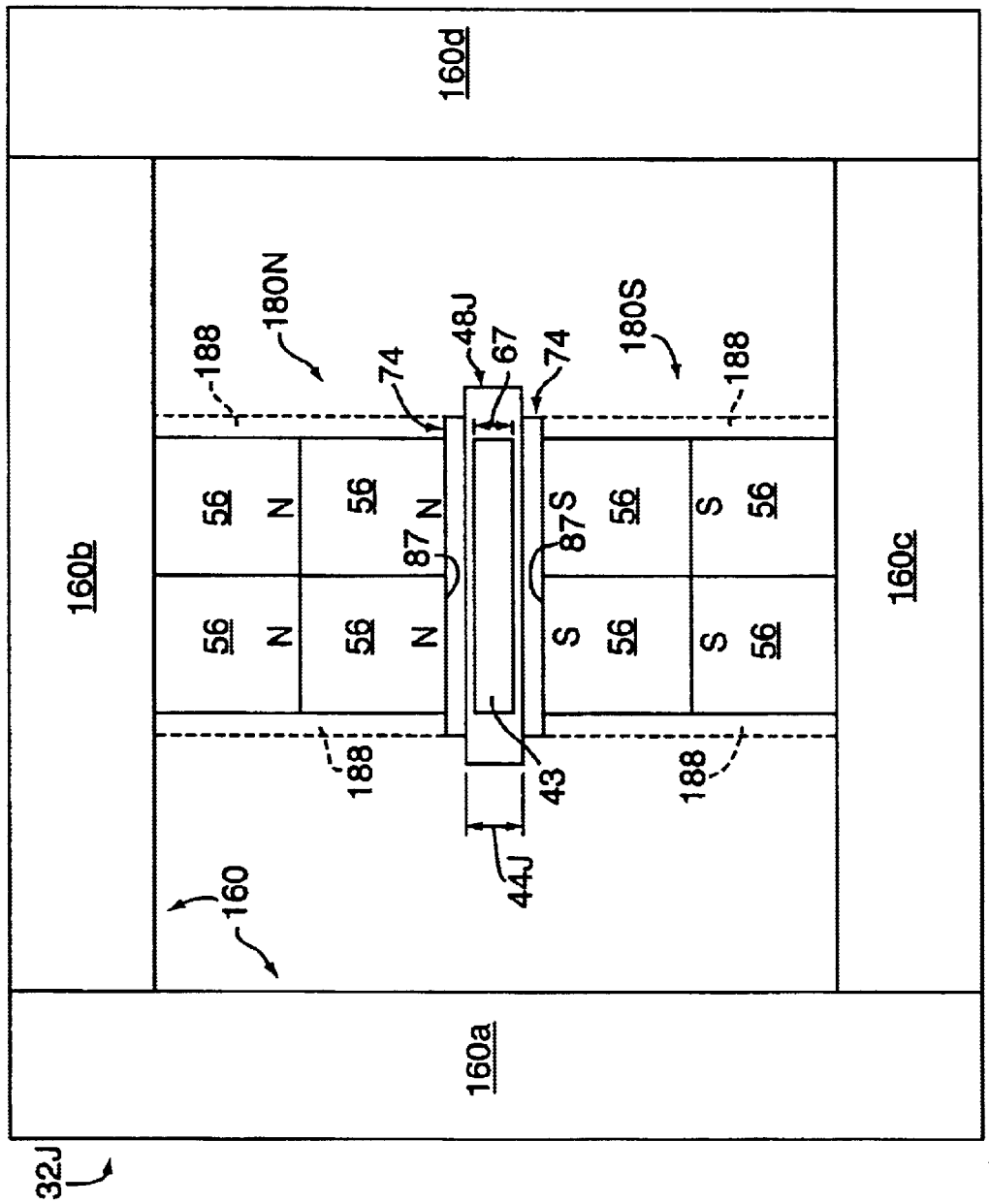
FIG. 19 is a front elevational view of the embodiment of FIG. 18.

FIGS. 18 and 19 show an electromagnetic pump 32J embodying the invention. First and second powerful cubical magnetic assemblies 180N and 180S each contain eight cubic neo-magnets 56 measuring about 51 mm (about 2 inches) along each edge. Thus, each powerful cubical magnetic assembly 180N and 180S measures about 102 mm (about 4 inches) along each edge and has an overall pole face 87 with an area of about 104 square centimeters (about 16 square inches). These pole faces 87 seat flush against a pancake cooling layer 74, and these pancake coolers seat flush against opposite faces 50J of the working area of conduit 48J.

A large ferromagnetic frame 160 encircles the two other magnetic assemblies. This frame includes upper and lower transverse members 160b and 160c and two upright members 160a and 160d. These frame members are suitably secured together by removable machine screws (not shown) for example similar to the arrangement of machine screws 63 in FIG. 2 so that the frame 160 can readily be disassembled.

It is noted that the upright members 160a and 160d are spaced relatively far from the two magnetic assemblies so as to minimize leakage of magnetic flux. Also, the nonmagnetic gap 44J between the opposed pole faces 87 as shown is only about 38 mm (about 1.5 inches).

In order to hold the two magnetic assemblies 180N and 180S together against the mutual repulsion between their neo-magnets 56, they are contained within respective nonmagnetic retainer casings, shown in dashed outline, for example made of aluminum.

The passage 43 has a height 67 of about 8 mm and a width 66 of about 102 mm (about 4 inches).

The pair of opposed electrodes (not shown) for feeding DC current I transversely through molten metal flow M are suitably mounted as explained above, and they each have a length of about 102 mm (about 4 inches).

A Test-rig Prototype

A convenient test-rig prototype employs a bismuth alloy similar to what is traditionally known as Wood's metal. This metal advantageously melts at a relatively low temperature of 70° C. (159° F.). It has a specific gravity of 10.5 g/cm$^3$ (0.38 lbs/in$^3$).

Figure 15:
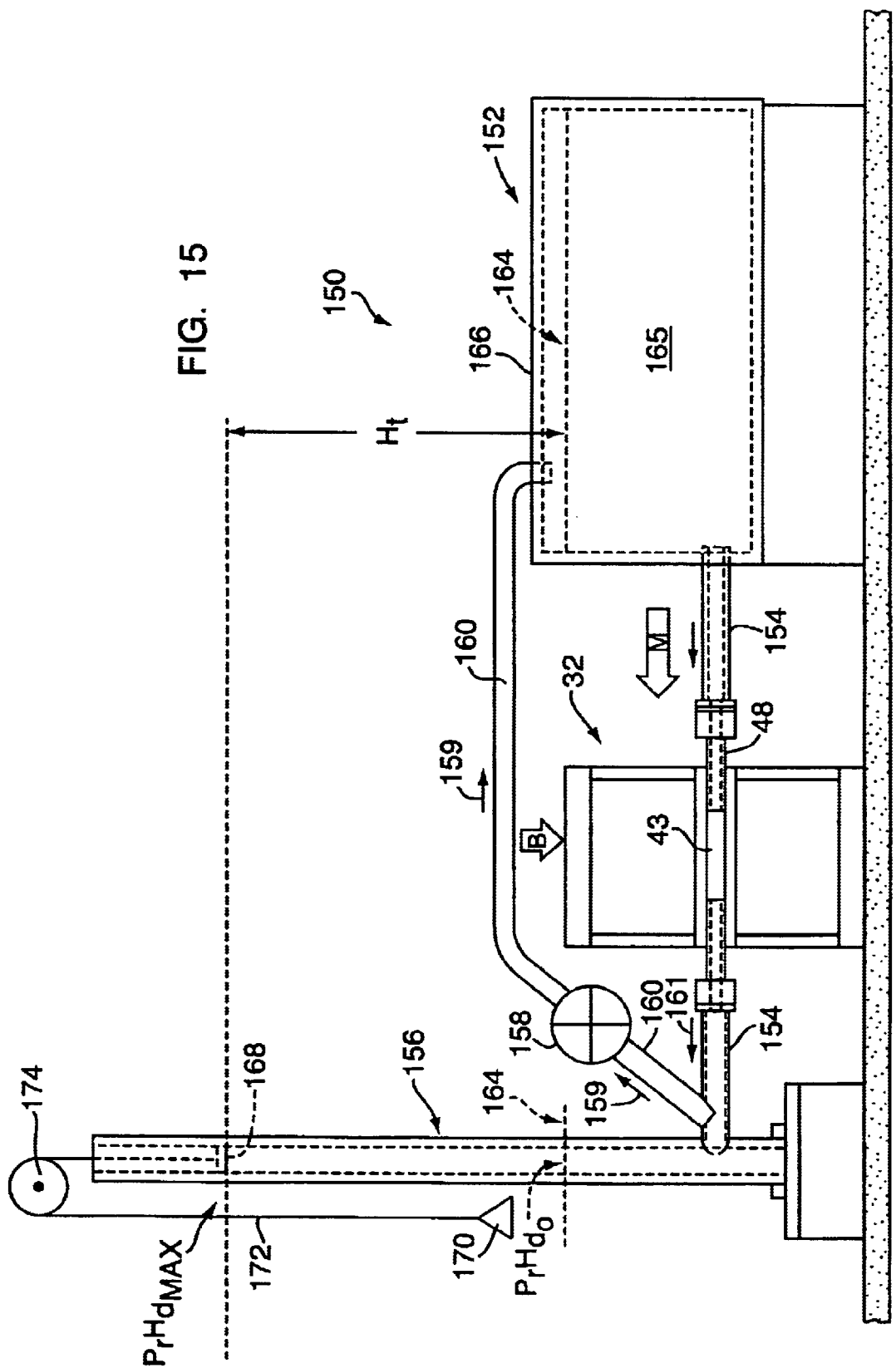
FIG. 15 is an elevation view of a convenient test setup.

A repeatable experiment was performed with test-rig 150, shown in elevation in FIG. 15. Pump 32 pumped metal from melting container 152 through pipes 154 and through straight, thin-wall pressurizing conduit 48 having a passage 43 of constant cross-sectional area for impelling the molten metal toward a head-measuring column 156. When a valve 158 was opened, the metal freely circulated from container 152 through pipes 154 and 160 and back into the container.

The temperature of the molten Wood's metal as pumped by pump 32 was about 93° C. (200° F.). The pressurizing conduit 48 was machined from a block of calcium silicate and had a shape like conduit 48 in FIG. 3. The passage 43 in the conduit 48 had a height of about 5.6 mm (about 0.22 inches) and a width of about 51 mm (about 2 inches), thus having a cross-sectional area of about 2.8 square centimeters (about 0.44 sq. inch).

A unidirectional magnetic flux density of about 7000 gauss (0.7 tesla) was applied through a gap of about 38 mm (about 1.5 inches) over an area of about 26 square centimeters (about 4 sq. inches) in the direction shown by the arrow B in FIGS. 15 and 2 through the two tapered pole pieces 58. This magnetic field was provided by four NdFeB commercially available high-energy neo-magnets placed as shown by mostly dashed lines in FIGS. 2 and 2A—two above with one pole piece 58 and two below with the other pole piece. Each of the four reach-out neo-magnets 56 was a cube measuring about 51 mm (about 2 inches) on each edge. With molten metal in the pump, a controllable electrical direct current (DC) of 0 to 500 amperes was applied between spaced parallel copper electrodes 68 of face area of about 2.4 square centimeters each, the current being in the direction shown by arrow I in FIGS. 2, 2A, 3 and 3A. This 500-ampere DC current was supplied by a welding machine capable of exerting 10 volts, though less than 4 volts were applied between the electrodes. During the tests described below, the voltage drop between the electrodes 68 and across the molten metal at 500 amperes measured about 0.5 volt.

Before the measurements of flow and head were made, the molten metal was allowed to circulate per arrows 161 and 159 for a few minutes to warm up the externally insulated pipes 154 and 160 as well as the externally insulated pressurizing conduit 48. The height of molten metal corresponding to zero pressure head as measured by an instrument measuring gauge pressure, i.e. pressure relative to atmospheric pressure, was the height of the free level 164 "PrHd$_o$" of the liquid metal 165 in the melting container 152. Steady atmospheric pressure on surface 164 of the liquid metal was ensured by loose-fitting cover 166. With the pump turned off, this level 164 was also the level of the liquid metal surface in open-top pressure-head-measuring column 156 (the insulation is not shown, for clarity of illustration). With the pump turned on and the valve 158 wide open, the liquid-metal level in column 156 did not increase much; the slight increase (which for simplicity is not distinguished further herein) was due mainly to the back pressure of friction and turbulence in pipe 160. Thus, the circulating flow rate (arrows 161 and 159) was measured as about 0.3 liters per second or about 11 metric tonnes per hour.

Then the valve 158 was closed to measure the available pressure head Ht in the absence of flow, i.e. at shutoff. To measure this highest pressure head Ht exertable by the pump, a block of aluminum 168 was floated on the surface of the Wood's metal in the column 156. A fine wire 172 attached to it went around a pulley 174 mounted at the top of the open-top column 156, the wire going down to be fastened to a counter-weight 170. From the vertical position of the counter-weight, simple arithmetic disclosed the height of the Wood's metal in the column.

The vertical liquid-metal columnar surface lift obtained with the valve 158 closed, i.e. in the absence of flow, was 350 mm above its height at zero pressure head PrHt$_o$, a vertical distance "Ht," which is to say a pressure head "PrHd$_{max}$" of 370 grams/cm$^2$ or 0.36 bar relative to the molten-metal level 164 (PrHd$_o$) at the liquid surface 164 of the melting container 152. This pressure head is calculated by multiplying the lift height Ht of 35.0 centimeters times the specific gravity 10.5 g/cm$^3$ of the molten metal 165.

The flow rate of the molten metal was sensed electromagnetically as described above, and the signal so generated controlled the pumping rate for keeping this rate substantially constant at about 0.3 liters per second as described above.

This experiment and its materials and parameters are described for expository purposes only and not to limit the scope of the invention, which may be embodied in a variety of apparatus with a variety of methods, materials and parameters.

Electromagnetic pumps embodying the invention can be used to raise molten copper to the height of a conventional tilting furnace, namely, as much as 3 meters of lift and more, that is, to a height of lift adequate to feed a continuous casting machine for example as shown in FIGS. 1 and 1A from an existing low-lying stationary furnace. In this way, the tilting furnace is no longer needed for holding and metering the pouring of molten metal into such a machine.

Controlling flow of molten metal comprising the steps of:
providing a pressurizing conduit having a working area formed of graphite, a fragile material;
protecting said graphite by shrouding it in a jacket formed of suitable rugged material having heat endurance and ability to withstand mechanical shocks and stresses;
and interposing electrically non-conductive material in said jacket positioned around said graphite for isolating the graphite from damage and unwanted piping stresses and from mechanical and electrical shocks and stresses occurring within said jacket.
controlling flow of molten metal by providing a pressurizing conduit formed of ceramic, a somewhat fragile material.
Protecting said ceramic by shrouding it in a jacket formed of suitable rugged material having heat endurance and ability to withstand mechanical shocks and stresses, and interposing electrically non-conductive material in said jacket positioned around said ceramic for isolating the ceramic from damage and unwanted piping stresses and from mechanical and electrical shocks and stresses occurring within said jacket.

Although specific presently preferred embodiments of the invention have been disclosed herein in detail, it is understood that many shapes and patterns of assemblies of neo-magnetic elements besides those described herein can be used to produce useful results. More generally, it is to be understood that the examples of the embodiments of the invention herein have been described for purposes of illustration. These disclosures are not intended to be construed as limiting the scope of the invention, since the described methods and apparatus may be changed in details by those skilled in the art of continuous casting and in the conveyance of molten metals in order to adapt these methods and apparatus to be useful relevant to particular continuous casting installations or for sequential pouring into a series of substantially identical molds, without departing from the scope of the following claims.

I claim:

1. Apparatus for controlling the flow of molten metal into a device for the manufacturing of articles of cast metal, the apparatus comprising:

a pressurizing conduit having an entrance, an exit, and a working area, said pressurizing conduit being resistant to the heat and corrosive effect of the molten metal being controlled, at least one pair of electrodes at the walls of said pressurizing conduit, said electrodes being positioned to provide between them a flow of direct current substantially perpendicularly through and across said flow of molten metal;

first and second assemblies of neo-magnets comprising a rare-earth element, said assemblies positioned on opposite sides of said conduit for providing magnetic flux extending through said working area in a direction generally perpendicular to flow of molten metal in said working area and said flow of direct current;

said first and second assemblies of neo-magnets including first and second pole pieces of magnetically soft ferromagnetic material respectively positioned on opposite sides of said conduit.

2. Apparatus for controlling flow of molten metal comprising:

a conduit formed of non-magnetic material having a passage suitable for controlling flow of molten metal in said passage;

first and second assemblies of neo-magnets positioned on opposite sides of said conduit for providing an intense magnetic field B extending through said passage in a direction generally perpendicular to flow M of molten metal in said passage;

first and second electrodes mounted on opposite sides of said conduit;

said electrodes being positioned for electrically conductive communication with molten metal within said passage, said first and second electrodes being suitable for connection in an electrical circuit with an electrical source of direct current for providing said first and second electrodes respectively with positive and negative voltage in said electrical circuit for causing electrical direct current I to flow through molten metal in said passage in a direction generally perpendicular to said intense magnetic field B and also generally perpendicular to flow M of molten metal;

said first and second assemblies of neo-magnets including first and second pole pieces of magnetically soft ferromagnetic material respectively positioned on opposite sides of said conduit;

said first pole piece having a pole face oriented generally perpendicular to said magnetic field B and being positioned near and facing toward a first side of said conduit;

said first assembly including a first plurality of neo-magnets positioned with their North poles adjacent to said first pole piece for providing North magnetic polarization of said pole face of said first pole piece;

said second pole piece having a pole face oriented generally perpendicular to said magnetic field B and being positioned near and facing toward a second side of said conduit opposite to said first side thereof;

said second assembly including a second plurality of neo-magnets positioned with their South poles adjacent to said second pole piece for providing South magnetic polarization of said pole face of said second pole piece;

a first enclosure of magnetically soft ferromagnetic material positioned around said first assembly; and a second enclosure of magnetically soft ferromagnetic material positioned around said second assembly.

3. Apparatus for controlling flow of molten metal comprising:

a conduit formed of non-magnetic material having a passage suitable for controlling flow of molten metal in said passage;

first and second assemblies of neo-magnets positioned on opposite sides of said conduit for providing an intense magnetic field B extending through said passage in a direction generally perpendicular to flow M of molten metal in said passage;

first and second electrodes mounted on opposite sides of said conduit;

said electrodes being positioned for electrically conductive communication with molten metal within said passage;

said first and second electrodes being suitable for connection in an electrical circuit with an electrical source of direct current for providing said first and second electrodes respectively with positive and negative voltage in said electrical circuit for causing electrical direct current I to flow through molten metal in said passage in a direction generally perpendicular to said intense magnetic field B and also generally perpendicular to flow M of molten metal;

said first and second assemblies of neo-magnets including first and second pole pieces of magnetically soft ferromagnetic material respectively positioned on opposite sides of said conduit;

said first pole piece being elongated and being oriented in a direction generally parallel with said direction of flow of direct current I;

said elongated first pole piece also being oriented in a direction generally transverse to said direction of flow M of molten metal;

said elongated first pole piece having an elongated pole face positioned near and facing toward a first side of said conduit and being oriented generally parallel with said direction of flow of direct current I and also being oriented generally transverse to said direction of flow M of molten metal;

said first assembly-including a first plurality of neo-magnets positioned with their North poles adjacent to said elongated first pole piece for providing North magnetic polarization of said elongated pole face of said elongated first pole piece;

said second pole piece being elongated and being oriented in a direction generally parallel with said direction of flow of direct current I;

said elongated second pole piece also being oriented in a direction generally transverse to said direction of flow M of molten metal;

said elongated second pole piece having an elongated pole face positioned near and facing toward a second side of said conduit opposite to said first side thereof and being oriented generally parallel with said direction of flow of direct current I and also being oriented generally transverse to said direction of flow M of molten metal; and said second assembly including a second plurality of neo-magnets positioned with their South poles adjacent to said elongated second pole piece for providing South magnetic polarization of said elongated pole face of said elongated second pole piece.

4. Apparatus for controlling flow of molten metal claimed in claim 3, wherein:

said first assembly includes elongated neo-magnets extending parallel with said elongated first pole piece; and said second assembly includes elongated neo-magnets extending parallel with said elongated second pole piece.

5. Apparatus for controlling flow of molten metal claimed in claim 3, wherein:

said first assembly also includes neo-magnets having North poles adjacent to ends of said elongated first pole piece; and said second assembly also includes neo-magnets having South poles adjacent to ends of said elongated second pole piece.

6. Apparatus for controlling flow of molten metal comprising:

a conduit formed of non-magnetic material having a passage suitable for controlling flow of molten metal in said passage;

first and second assemblies of neo-magnets positioned on opposite sides of said conduit for providing an intense magnetic field B extending-through said passage in a direction generally perpendicular to flow M of molten metal in said passage;

first and second electrodes mounted on opposite sides of said conduit;

said electrodes being positioned for electrically conductive communication with molten metal within said passage;

said first and second electrodes being suitable for connection in an electrical circuit with an electrical source of direct current for providing said first and second electrodes respectively with positive and negative voltage in said electrical circuit for causing electrical direct current I to flow through molten metal in said passage in a direction generally perpendicular to said intense magnetic field B and also generally perpendicular to flow H of molten metal;

first and second neo-magnet assemblies each including eight neo-magnets;

said first and second assemblies being respectively positioned on opposite sides of said conduit;

said first neo-magnet assembly including an inner tier of four neo-magnets having their North poles positioned near and facing toward a first side of said conduit;

said first neo-magnet assembly including an outer tier of four neo-magnets having their North poles positioned adjacent to respective South poles of the four neo-magnets m said inner tier;

said second neo-magnet assembly including an inner tier of four neo-magnets having their South poles positioned near and facing toward a second side of said conduit opposite to said first side thereof;

said second neo-magnet assembly including an outer tier of four neo-magnets having their South poles positioned adjacent to respective North poles of the four neo-magnets in said inner tier;

non-magnetic retainers positioned around said first and second neo-magnet assemblies for holding together said first and second neo-magnet assemblies; and a frame of magnetically soft ferromagnetic material encircling said first and second neo-magnet assemblies and also encircling said conduit.

7. Apparatus for controlling flow of molten metal claimed in claim 6, wherein:
said eight neo-magnets in each of said first and second neo-magnet assemblies are cubical in configuration; and
said first and second neo-magnet assemblies are cubical in overall configuration.

8. Apparatus for controlling flow of molten metal comprising:
a conduit formed of non-magnetic material having a passage suitable for controlling flow of molten metal in said passage; first and second assemblies of neo-magnets positioned on opposite sides of said conduit for providing an intense magnetic field B extending through said passage in a direction generally perpendicular to flow M of molten metal in said passage;
first and second electrodes mounted on opposite sides of said conduit;
said electrodes being positioned for electrically conductive communication with molten metal within said passage;
said first and second electrodes being suitable for connection in an electrical circuit with an electrical source of direct current for providing said first and second electrodes respectively with positive and negative voltage in said electrical circuit for causing electrical direct current I to flow through molten metal in said passage in a direction generally perpendicular to said intense magnetic field B and also generally perpendicular to flow M of molten metal;
said first and second assemblies of neo-magnets including first and second pole pieces of magnetically soft ferromagnetic material respectively positioned on opposite sides of said conduit;
said first pole piece having a pole face positioned near and facing toward a first side of said conduit;
said second pole piece having a pole face positioned near and facing toward a second side of said conduit opposite to said first side thereof;
said first pole piece having a plurality of surfaces extending from the pole face thereof;
said surfaces of the first pole piece being oriented generally perpendicular to said pole face of said first pole piece;
said first assembly including a plurality of neo-magnets having North poles adjacent to respective surfaces of the first pole piece for providing North magnetic polarity for said pole face of the first pole piece;
said second pole piece having a plurality of surfaces extending from the pole face thereof;
said surfaces of the second pole piece being oriented generally perpendicular to said pole face of the second pole piece; and
said second assembly including a plurality of neo-magnets having South poles adjacent to respective surfaces of the second pole piece for providing South magnetic polarity for said pole face of the second pole piece.

9. Apparatus for controlling flow of molten metal claimed in claim 8, wherein:
said first and second pole pieces are equilateral triangular parallelepipeds; and
said first and second assemblies each include three neo-magnets.

10. Apparatus for controlling flow of molten metal claimed in claim 9, wherein:
said first and second pole pieces have outer ends configured as equilateral triangles;
said first assembly includes a neo-magnet having an equilateral triangular configuration having a North pole positioned adjacent to the outer end of the first pole piece; and
said second assembly includes a neo-magnet having an equilateral triangular configuration having a South pole positioned adjacent to the outer end of the second pole piece.

11. Apparatus for controlling flow of molten metal claimed in claim 8, wherein:
said first and second pole pieces are rectangular parallelepipeds; and
said first and second assemblies each include four neo-magnets.

12. Apparatus for controlling flow of molten metal claimed in claim 8, wherein:
said first and second pole pieces are square parallelepipeds; and
said first and second assemblies each include four neo-magnets.

13. Apparatus for controlling flow of molten metal claimed in claim 12, wherein:
said first and second pole pieces have square outer ends;
said first assembly includes a neo-magnet having a square North pole adjacent to the square outer end of the first pole piece; and
said second assembly includes a neo-magnet having a square South pole adjacent to the square outer end of the second pole piece.

14. Apparatus for controlling flow of molten metal claimed in claim 8, wherein:
said first and second pole pieces are hexagonal in cross section; and
said first and second assemblies each include six neo-magnets.

15. Apparatus for controlling flow of molten metal claimed in claim 14, wherein:
said first and second pole pieces have hexagonal outer ends;
said first assembly includes a neo-magnet having a hexagonal North pole adjacent to the hexagonal outer end of the first pole piece; and
said second assembly includes a neo-magnet having a hexagonal South pole adjacent to the hexagonal outer end of the second pole piece.

16. Apparatus for controlling flow of molten metal comprising:
a conduit formed of non-magnetic material having a passage suitable for controlling flow of molten metal in said passage;
first and second neo-magnets positioned on opposite sides of said conduit for providing an intense magnetic field B extending through said passage in a direction generally perpendicular to flow M of molten metal in said passage;
first and second electrodes mounted on opposite sides of said conduit;
said electrodes being positioned for electrically conductive communication with molten metal within said passage;

said first and second electrodes being suitable for connection in an electrical circuit with an electrical source of direct current for providing said first and second electrodes respectively with positive and negative voltage in said electrical circuit for causing electrical direct current I to flow through molten metal in said passage in a direction generally perpendicular to said intense magnetic field B and also generally perpendicular to flow M of molten metal;

said first and second assemblies of neo-magnets including first and second pole pieces of magnetically soft ferromagnetic material respectively positioned on opposite sides of said conduit;

said first and second pole pieces being circular cylindrical; and said first and second neo-magnets being annular rings respectively encircling the first and second circular cylindrical pole pieces;

said first neo-magnet being magnetized in a direction through its radial thickness and having an inner North pole adjacent to the first circular cylindrical pole piece; and said second neo-magnet being magnetized in a direction through its radial thickness and having an inner South pole adjacent to the second circular cylindrical pole piece.

17. Apparatus for controlling flow of molten metal claimed in claim 16, wherein:

said first and second pole pieces have circular outer ends;

a circular neo-magnet has a North pole adjacent to the circular outer end of the first pole piece; and another circular neo-magnet has a South pole adjacent to the circular outer end of the second pole piece.

18. A method for controlling flow of molten metal comprising steps of:

providing a pressurizing conduit formed of non-magnetic material;

providing said pressurizing conduit having a generally constant height and a generally constant width throughout the working area of said pressurizing conduit;

said width being greater than said height;

positioning at least one neo-magnet above said working area;

positioning at least one neo-magnet below said working area;

said neo-magnet positioned above said working area having its north polarity pole face oriented in a magnetic circuit B for directing its magnetic flux through said working area;

said neo-magnet positioned below said working area having its south polarity pole face oriented in said magnetic circuit B for directing its magnetic flux through said working area in additive relationship relative to the magnetic flux of said neo-magnet positioned above said working area of said pressurizing conduit;

positioning a DC electrode having positive electrical potential on one side of said working area of said pressurizing conduit; positioning a DC electrode having negative electrical potential on the opposite side of said working area of said pressurizing conduit from said DC electrode having positive electrical potential; and said electrodes being positioned for electrical conductive communication with molten metal M within said working area of the pressurizing conduit.

19. Apparatus for controlling flow of molten metal claimed in claim 17, wherein:

said electrodes have a greater length in electrical conductive communication with molten metal M in the direction of flow of said molten metal M than their height in electrical conductive communication with molten metal M in the direction of magnetic flux passing through said molten metal M.

20. A method for controlling flow of molten metal claimed in claim 18, further comprising:

mounting said electrodes in electrically non-conductive electrode holders seated within opposite walls of the working area of the pressurizing conduit with portions of the electrodes being exposed to electrically conductive communication to molten metal in the working area of the pressurizing conduit.

21. A method for controlling flow of molten metal claimed in claim 20, wherein:

said electrode holders are seated within exterior portions of the wall of the pressurizing conduit; and each of said electrodes has a portion which protrudes inwardly from its electrode holder into electrically conductive communication with molten metal M within the working area of the pressurizing conduit.

22. A method for controlling flow of molten metal comprising steps of:

providing a pair of elongated neo-magnets of equal length each having elongated magnetically polarized pole faces extending for the length of the neo-magnet;

positioning said elongated neo-magnets in vertically spaced parallel relationship with one of said elongated neo-magnets being positioned above a working area of a pressurizing conduit and the other of said elongated neo-magnets being positioned below said working area of the pressurizing conduit;

orienting the magnetically polarized pole faces of the elongated neo-magnets for directing their magnetic flux in magnetically additive relation in a magnetic flux circuit B passing through the working area of the pressurizing conduit; and positioning said elongated neo-magnets with their length extending generally perpendicular to flow of molten metal within the working area of the pressurizing conduit, thereby providing a molten metal pump having a pressurizing passage with a flow width more than ten times greater than its height.

23. A method for controlling flow of molten metal comprising steps of:

providing a pressurizing conduit formed of non-magnetic material;

providing said pressurizing conduit having a generally constant height and a generally constant width throughout the working area of said pressurizing conduit;

said width being greater than said height;

positioning at least one neo-magnet above said working area;

positioning at least one neo-magnet below said working area;

said neo-magnet positioned above said working area having its north polarity pole face oriented in a magnetic circuit B for directing its magnetic flux through said working area;

said neo-magnet positioned below said working area having its south polarity pole face oriented in said magnetic circuit B for directing its magnetic flux through said working area in additive relationship relative to the magnetic flux of said neo-magnet positioned above said working area of said pressurizing conduit;

positioning a DC electrode having positive electrical potential on one side of said working area of said pressurizing conduit;

positioning a DC electrode having negative electrical potential on the opposite side of said working area of said pressurizing conduit from said DC electrode having positive electrical potential;

said electrodes being positioned for electrical conductive communication with molten metal M within said working area of the pressurizing conduit;

positioning four flow-sensing electrodes in electrically conductive communication with molten metal M within said working area of the pressurizing conduit;

two of said flow-sensing electrodes being positioned upstream relative to the flow of molten metal M within said working area;

two of said flow-sensing electrodes being positioned downstream relative to the flow of molten metal M within said working area;

said flow-sensing electrodes being symmetrically positioned upstream and downstream relative to the flow of molten metal M in said working area and also being symmetrically positioned left and right relative to the flow of molten metal M in said working area; and combining and averaging electrical outputs from said sensing electrodes for canceling undesired e.m.f.s to not distort the generated and combined control e.m.f. to be fed into a meter or control for D.C. current I being fed through molten metal M within said working area of the pressurizing conduit.

* * * * *

UNITED STATES PATENT AND TRADEMARK OFFICE
CERTIFICATE OF CORRECTION

PATENT NO. : 6,732,890 B2
DATED : May 11, 2004
INVENTOR(S) : Valery G. Kagan

It is certified that error appears in the above-identified patent and that said Letters Patent is hereby corrected as shown below:

Column 20,
Line 52, after "magnets" delete "m" and substitute -- in --.

Signed and Sealed this

Second Day of November, 2004

JON W. DUDAS
*Director of the United States Patent and Trademark Office*